United States Patent
Ichimaru et al.

(10) Patent No.: US 11,787,139 B2
(45) Date of Patent: Oct. 17, 2023

(54) TIRE CURING APPARATUS AND TIRE CURING METHOD

(71) Applicant: ROCKY-ICHIMARU CO., LTD., Fukuoka (JP)

(72) Inventors: Hironobu Ichimaru, Fukuoka (JP); Soichiro Iwatsu, Fukuoka (JP)

(73) Assignee: ROCKY-ICHIMARU CO., LTD., Chikugo (JP)

( * ) Notice: Subject to any disclaimer, the term of this patent is extended or adjusted under 35 U.S.C. 154(b) by 497 days.

(21) Appl. No.: 17/042,789

(22) PCT Filed: Apr. 12, 2018

(86) PCT No.: PCT/JP2018/015339
§ 371 (c)(1),
(2) Date: Sep. 28, 2020

(87) PCT Pub. No.: WO2019/198193
PCT Pub. Date: Oct. 17, 2019

(65) Prior Publication Data
US 2021/0023803 A1    Jan. 28, 2021

(51) Int. Cl.
*B29D 30/00* (2006.01)
*B29D 30/06* (2006.01)

(52) U.S. Cl.
CPC .. *B29D 30/0606* (2013.01); *B29D 2030/0607* (2013.01)

(58) Field of Classification Search
CPC .................... B29D 30/0606; B29D 2030/0607
See application file for complete search history.

(56) References Cited

FOREIGN PATENT DOCUMENTS

| JP | 2001-001346 A | 1/2001 | |
|---|---|---|---|
| JP | 2005-053022 A | 3/2005 | |
| JP | 102198715 A | * 9/2011 | ......... B29D 30/0601 |
| JP | 2011-194812 A | 10/2011 | |
| JP | 2017170643 A | * 9/2017 | ............ B29C 33/02 |

OTHER PUBLICATIONS

JP CN102198715A English Translation 2011 (Year: 2011).*
Onimatsu JP2017170643A English Translation 2017 (Year: 2017).*

* cited by examiner

*Primary Examiner* — Jacob T Minskey
*Assistant Examiner* — Adrien J Bernard
(74) *Attorney, Agent, or Firm* — Heedong Chae; Lucem, PC

(57) ABSTRACT

A tire curing apparatus having two guide rods, a mold having an upper mold and a lower mold, an upper plate, a lower plate, and an upper-mold raising/lowering device. Two clamp grooves (a first clamp groove and a second clamp groove) are formed on a path along which the upper plate moves on an outer peripheral surface of the guide rod. The upper plate has a clamping device. The clamping device is formed of a clamp block and fixes the upper plate by being fitted to the first or second clamp groove.

14 Claims, 15 Drawing Sheets

TIRE CURING APPARATUS AND TIRE CURING METHOD

TECHNICAL FIELD

The present invention relates to a tire curing apparatus and a tire curing method. In detail, the present invention relates to a tire curing apparatus that is capable of corresponding to various mold heights although its mechanism is simple, that is capable of reducing its apparatus size, and that is excellent in handleability, and relates to a tire curing method.

BACKGROUND ART

In tire manufacturing, a green tire, which has been beforehand shaped roughly like a finished product, is put into a mold, is then pressurized, and is heated. At this time, a bladder disposed in the mold is expanded, and curing is performed in a state in which the bladder has been brought into contact with an inner surface of the green tire.

Ordinarily, a mold of any of various sizes (outer diameters and heights) is attached to a tire curing apparatus in accordance with the size of a tire to be cured. In other words, there are a plurality of kinds of molds that match respective tire sizes, and there are their heights (mold heights), and a mold replacement operation is required with respect to one tire curing apparatus.

Additionally, the tire curing apparatus is provided with a clamping mechanism and a mold pressurizing mechanism that are used to maintain a closed state of the mold with respect to pressure generated inside the mold when the green tire is cured.

In the clamping mechanism that is one of the mechanisms, clamp positions exist at which positions of upper and lower plates to which the mold consisting of a pair of mold halves is attached are fixed in accordance with the height of the mold that has been closed. In other words, the upper plate or the lower plate is moved, and the upper and lower plates are fixed in a state in which a position at which the mold that has been closed can be fixed is set as a clamp position.

The upper and lower plates are fixed in this way, hence making it possible to maintain a state in which the mold has been closed while preventing the mold from being opened by pressure generated inside the mold when the tire is cured.

The clamp position in this clamping mechanism is determined by, for example, the formation position of a clamp groove formed at a guide rod that guides the movement of the upper plate or the lower plate.

Additionally, a movable plate is, i.e., the upper plate or the lower plate is provided with a clamp portion that is to be fitted to the clamp groove, and this clamp portion is fitted and locked into the clamp groove, and, as a result, the upper and lower plates are fixed.

Additionally, there is also a structure serving as a clamping mechanism in which, independently of the guide rod, one of the upper and lower plates is provided with a slender clamp rod having its front end at which a clamp groove is formed, and the other one of the upper and lower plates is provided with a clamp portion, and the front end of the clamp rod reaches the clamp portion, and is fitted and locked thereinto, and, as a result, the upper and lower plates are fixed.

In the clamping mechanism of the thus-formed conventional tire curing apparatus, the clamp groove is configured to be formed at one place of the guide rod or of the clamp rod. In other words, the number of clamp positions is limited to one place, and, when a change to a mold having a different size is made in accordance with the size of a tire, the operation of changing the height position of the mold is required.

More specifically, a need arises to adjust the height position of the mold that has been closed at a position at which clamping can be performed by the clamping mechanism. In other words, the mold must be moved to a height position at which clamping can be performed by the clamping mechanism. Additionally, the height position of the mold that has been closed depends on the size of the mold used here.

As a range of the aforementioned height position of the mold that has been closed, a single tire curing apparatus is ordinarily required to have an allowable range of several hundreds of millimeters with respect to the height position of the mold. For example, if the tire curing apparatus is for typical passenger vehicle tires, the tire curing apparatus has such a structure as to be applicable to a range of about 200 to 600 mm with respect to the height position of the mold.

In these circumstances, a tire curing apparatus that maintains a closed state of a mold by means of a clamping mechanism, such as a tire curing apparatus disclosed by Patent Literature 1, has a mold-height adjusting mechanism as a structure for changing the height position of a mold (see FIG. 1B, FIG. 2A, and FIG. 2B).

The mold-height adjusting mechanism 3 of the tire curing apparatus 100 of Patent Literature 1 mentioned here is composed of a nut 3a rotatably attached to a lower plate 10 and a screw 3b that engages with the nut 3a. Additionally, a lower mold 2b is attached to the screw 3b through a pressurizing mechanism 9 (or 9'), a thermal insulation plate 7, and a lower heat plate 6b.

In the mold-height adjusting mechanism 3, the screw 3b is raised and lowered with respect to the lower plate 10 in a vertical direction by rotating the nut 3a with respect to the screw 3b, and, in response to this movement, the lower mold 2b is also raised and lowered, and hence the height position of the mold can be changed.

For example, the screw 3b is lowered, and, as a result, a state is reached in which the screw 3b has been lowered to the lowest position with respect to the lower plate 10, i.e., a state is reached in which the height position of the mold is smallest (a closed state is reached in which the thickness of the mold is largest) (see FIG. 2A).

Additionally, the screw 3b is raised, and, as a result, a state is reached in which the screw 3b has been raised to the highest position with respect to the lower plate 10, i.e., a state is reached in which the height position of the mold is largest (a closed state is reached in which the thickness of the mold is smallest) (see FIG. 2B).

Additionally, the screw 3b is stopped at a desired position in a movable range having upper and lower limits, and, as a result, the height position of the mold can be set. The thus-configured mold-height adjusting mechanism 3 makes it possible to set the height position of the mold in accordance with a clamp position when a change to another mold having a different size is made.

CITATION LIST

Patent Literature

Patent Literature 1: Specification of Japanese Patent No. 3762092
Patent Literature 2: Specification of Japanese Patent No. 3254100

SUMMARY OF INVENTION

Technical Problem

However, in the tire curing apparatus of Patent Literature 1, the distance from an upper end of the lower plate 10 to a lower end of the pressurizing mechanism 9 (i.e., part shown by reference sign H in FIG. 2B) comes to about 400 mm when the height position of the mold is set to become largest as shown in FIG. 2B.

Additionally, in recent years, a mode in which a tire curing apparatus is placed on a floor surface without forming an underground pit (vertical hole) in the floor surface that is a workplace has been increasingly employed from the viewpoint of reducing costs for installing the tire curing apparatus or of improving maintainability.

At this time, the height from the floor surface to the lower plate is required to be ordinarily 1500 mm or more because of the structure of the tire curing apparatus. If, in addition to this height, 400 mm mentioned above is added as the height position of the mold, the height from the floor surface to the mold will come to 1900 mm or more.

The height from the floor surface to the mold is raised in this way, and, as a result, the mold has been hindered from being visually inspected, or a tire curing situation has been hindered from being ascertained. Additionally, disadvantageously, a mold replacement operation or a maintenance operation has not been easily performed.

Still additionally, the tire curing apparatus cannot avoid being lengthened in the vertical direction, and a wide space for installing the tire curing apparatus has been required.

The present invention has been made in consideration of these circumstances, and aims to provide a tire curing apparatus that is capable of corresponding to various mold heights although its mechanism is simple, that is capable of reducing its apparatus size, and that is excellent in handleability, and provide a tire curing method.

Solution to Problem

To achieve the aforementioned object, the tire curing apparatus of the present invention includes a first plate to which a first mold provided with a bladder that heats and pressurizes a green tire is attached, a second plate to which a second mold configured such that the bladder can be sandwiched between the first mold and the second mold in cooperation with the first mold is attached, a substantially cylindrical guide rod that is attached to the first plate and to the second plate and that guides relative movements of both the first plate and the second plate, a mold moving mechanism that relatively moves the first plate and the second plate along the guide rod, a mold pressurizing mechanism that applies pressure to both the first mold and the second mold that have been closed together and holds a closed state when the green tire is heated and pressurized by the bladder, and a clamping mechanism that fixes relative positions of both the first plate and the second plate and holds a closed state at a clamp position corresponding to a size of the first mold and the second mold that have been closed together when the green tire is heated and pressurized by the bladder and that has a plurality of the clamp positions.

Here, the first mold, which is provided with the bladder that heats and pressurizes a green tire, and the second mold, which is configured such that the bladder can be sandwiched between the first mold and the second mold in cooperation with the first mold, make it possible to heat, pressurize, and cure a green tire disposed between each of the molds and the bladder while sandwiching the bladder between the first mold and the second mold.

Additionally, the first plate, to which the first mold is attached, the second plate, to which the second mold is attached, the guide rod, which is attached to the first plate and to the second plate and which guides relative movements of both the first plate and the second plate, and the mold moving mechanism, which relatively moves the first plate and the second plate along the guide rod, make it possible to move the first plate or the second plate along the guide rod and close the first mold and the second mold together. Additionally, it is possible to, after completing tire curing, separate the first and second molds from each other and release the first and second molds from a closed state. It should be noted that the term "relatively move the first plate and the second plate" mentioned here denotes both a manner in which the first plate is fixed whereas the second plate is moved and a manner in which the second plate is fixed whereas the first plate is moved.

Additionally, when a green tire is heated and pressurized by the bladder, the mold pressurizing mechanism holds a closed state while applying pressure to the first and second molds that have been closed together, and hence it becomes possible to inhibit a phenomenon in which the first and second molds that have been closed together attempt to open because of pressure generated when the tire is heated and pressurized.

Additionally, the substantially cylindrical guide rod, which is attached to the first plate and to the second plate and which guides relative movements of both the first plate and the second plate, the mold moving mechanism, which relatively moves the first plate and the second plate along the guide rod, the clamping mechanism, which fixes relative positions of both the first plate and the second plate and holds a closed state at a clamp position corresponding to a size of the first mold and the second mold that have been closed together when the green tire is heated and pressurized by the bladder, make it possible to move the first plate or the second plate along the guide rod, to fix the position of each plate by means of the clamping mechanism, and to hold the closed state of the molds. In other words, even in the clamping mechanism, in addition to the mold pressurizing mechanism, it is possible to inhibit a phenomenon in which the first and second molds that have been closed together attempt to open because of pressure generated when the tire is heated and pressurized. It should be noted that the term "relatively move the first plate and the second plate" mentioned here denotes both a manner in which the first plate is fixed whereas the second plate is moved and a manner in which the second plate is fixed whereas the first plate is moved.

Additionally, the clamping mechanism fixes relative positions of both the first plate and the second plate and holds a closed state at a clamp position corresponding to a size of the first mold and the second mold that have been closed together, and the clamping mechanism has a plurality of clamp positions, hence making it possible to set a mold height position in accordance with a clamp position without greatly changing the height position of the mold when the mold is replaced by another mold having a different size. In other words, if the replacement of a mold by another mold having a different size is made so that the size of a mold is changed when the mold is closed in the single tire curing apparatus, the operation of adjusting a clamp position and a mold height position to each other is required. In this operation, if a position that matches the size of a mold is selected from among a plurality of clamp positions, it becomes unnecessary to make a positional adjustment only by changing the mold height position. As a result, for example, when the height position of a mold consisting of upper and lower molds is changed by raising the lower mold, the distance by which the lower mold rises becomes shorter, hence making it possible to lower the height position of the mold from a floor surface or the like on which the tire curing apparatus is placed. Additionally, it is possible to reduce the size of the entire tire curing apparatus.

Additionally, if the clamping mechanism is composed of clamp grooves that are formed at a plurality of mutually different positions, respectively, in a longitudinal direction of the guide rod and each of which serves as the clamp position and a clamp portion that is disposed at at-least either one of the first plate and the second plate and that fixes relative positions of both the first plate and the second plate by being fitted to the clamp groove, it becomes possible to move the first plate or the second plate along the guide rod and hold a closed state of the mold when a tire is cured while fitting the clamp portion to the clamp groove of the guide rod. Additionally, it is possible to form a plurality of clamp grooves at the guide rod and select a clamp position matched to the size of the mold from among these clamp grooves.

Additionally, if the clamping mechanism is composed of a clamp rod that is positioned at a surface, which faces the second plate, of the first plate, that is a substantially cylindrical body formed so as to protrude in a direction of the second plate, and that has clamp grooves serving as the clamp positions, respectively, and formed at a front-end side of the clamp rod and at a plurality of mutually different positions in the longitudinal direction and a clamp portion that is disposed at the second plate and that fixes relative positions of both the first plate and the second plate by being fitted to the clamp groove, it becomes possible to hold a closed state of the mold when a tire is cured while fitting the clamp groove formed at a front end of the clamp rod disposed at the first plate to the clamp portion disposed at the second plate. Additionally, it is possible to form a plurality of clamp grooves at the front-end side of the clamp rod and select a clamp position matched to the size of the mold from among these clamp grooves.

Additionally, if the clamping mechanism is composed of a clamp rod that is positioned at a surface, which faces the first plate, of the second plate, that is a substantially cylindrical body formed so as to protrude in a direction of the first plate, and that has clamp grooves serving as the clamp positions, respectively, and formed at a front-end side of the clamp rod and at a plurality of mutually different positions in the longitudinal direction and a clamp portion that is disposed at the first plate and that fixes relative positions of both the first plate and the second plate by being fitted to the clamp groove, it becomes possible to hold a closed state of the mold when a tire is cured while fitting the clamp groove formed at a front end of the clamp rod disposed at the second plate to the clamp portion disposed at the first plate. Additionally, it is possible to form a plurality of clamp grooves at the front-end side of the clamp rod and select a clamp position matched to the size of the mold from among these clamp grooves.

Additionally, if the clamping mechanism is composed of first clamp grooves serving as the clamp positions, respectively, and formed at a plurality of mutually different positions in the longitudinal direction of the guide rod, a first clamp portion that is disposed at at-least either one of the first plate and the second plate and that fixes relative positions of both the first plate and the second plate by being fitted to the first clamp groove, a clamp rod that is positioned at a surface, which faces the second plate, of the first plate, that is a substantially cylindrical body formed so as to protrude in a direction of the second plate, and that has second clamp grooves serving as the clamp positions, respectively, and formed at a front-end side of the clamp rod and at a plurality of mutually different positions in the longitudinal direction, and a second clamp portion that is disposed at the second plate and that fixes relative positions of both the first plate and the second plate by being fitted to the second clamp groove, it becomes possible to hold a closed state of the mold when a tire is cured both in the first clamp portion using the guide rod and in the second clamp portion using the clamp rod disposed at the first plate.

Here, it is possible to allow the clamp position of the first clamp portion and the clamp position of the second clamp portion to correspond to each other and is possible to hold a state in which the mold has been closed by the two clamp portions with respect to one kind of mold. At this time, it is possible to make a mold-holding force even stronger. Additionally, it is also possible to allow the clamp position of the first clamp portion and the clamp position of the second clamp portion to differ from each other and hold a mold-closing state with respect to molds differing in size by use of the respective clamp portions. At this time, the clamp position changes in each of the clamp portions, and therefore it is possible to widen the range of a mold size that can be handled in one tire curing apparatus.

Additionally, if the clamping mechanism is composed of first clamp grooves serving as the clamp positions, respectively, and formed at a plurality of mutually different positions in the longitudinal direction of the guide rod, a first clamp portion that is disposed at at-least either one of the first plate and the second plate and that fixes relative positions of both the first plate and the second plate by being fitted to the first clamp groove, a clamp rod that is positioned at a surface, which faces the first plate, of the second plate, that is a substantially cylindrical body formed so as to protrude in a direction of the first plate, and that has second clamp grooves serving as the clamp positions, respectively, and formed at a front-end side of the clamp rod and at a plurality of mutually different positions in the longitudinal direction, and a second clamp portion that is disposed at the first plate and that fixes relative positions of both the first plate and the second plate by being fitted to the second clamp groove, it becomes possible to hold a closed state of the mold when a tire is cured both in the first clamp portion using the guide rod and in the second clamp portion using the clamp rod disposed at the second plate.

Additionally, if the tire curing apparatus further includes a mold-height adjusting mechanism that is disposed at the first plate and that is capable of changing a distance between the first mold and the first plate, it becomes possible to adjust the clamp position and the mold height position to each other by changing the distance between the first mold and the first plate when the mold is replaced by another mold having a different size. Additionally, it is possible to select the clamp position from among a plurality of positions as described above, and therefore it becomes possible to shorten the length of a to-be-changed distance when the distance between the first mold and the first plate is changed.

Additionally, if the tire curing apparatus further includes a guide-rod adjusting mechanism that is capable of changing a position of the guide rod with respect to the first plate along a longitudinal direction of the guide rod, it becomes possible to change the position of the clamp groove by changing the position of the guide rod. In other words, it becomes possible to adjust the clamp position by changing the position of the guide rod with respect to the first plate in accordance with the size of the mold. As a result, it becomes possible to adjust the clamp position and the mold height position to each other only by a positional adjustment of the guide rod. In other words, it is possible to control the clamp position only by a positional adjustment of the guide rod, for example, without providing a mold-height adjusting mechanism that adjusts the distance between the first mold and the first plate. Additionally, the guide rod is provided with a plurality of clamp grooves, and therefore it is also possible to shorten a distance for the positional adjustment of the guide rod.

Additionally, to achieve the aforementioned object, the tire curing apparatus of the present invention includes a first plate to which a first mold provided with a bladder that heats and pressurizes a green tire is attached, a second plate to which a second mold configured such that the bladder can be sandwiched between the first mold and the second mold in cooperation with the first mold is attached, a substantially cylindrical guide rod that is attached to the first plate and to the second plate and that guides relative movements of both the first plate and the second plate, a mold moving mechanism that relatively moves the first plate and the second plate along the guide rod, a mold pressurizing mechanism that applies pressure to both the first mold and the second mold that have been closed together and holds a closed state when the green tire is heated and pressurized by the bladder, and a clamping mechanism that fixes relative positions of both the first plate and the second plate and holds a closed state at a clamp position corresponding to a size of the first mold and the second mold that have been closed together when the green tire is heated and pressurized by the bladder, in which the clamping mechanism is composed of a clamp groove that is formed at the guide rod and that serves as the clamp position, and a clamp portion that is disposed at at-least either one of the first plate and the second plate and that fixes relative positions of both the first plate and the second plate by being fitted to the clamp groove, and the clamp portion has a clamp-portion adjusting mechanism that is capable of changing a distance between the clamp portion and either the first plate or the second plate that is provided with the clamp portion.

Here, the clamp portion has the clamp-portion adjusting mechanism that is capable of changing a distance between the clamp portion and either the first plate or the second plate that is provided with the clamp portion, hence making it possible to change the position of the clamp portion fitted to the clamp groove by changing a distance between the clamp portion and the plate provided with the clamp portion. In other words, it becomes possible to adjust the clamp position by changing the position of the clamp portion in accordance with the size of the mold. As a result, it becomes possible to adjust the clamp position and the mold height position to each other only by a positional adjustment of the clamp portion. In other words, it is possible to control the clamp position only by a positional adjustment of the clamp portion, for example, without providing a mold-height adjusting mechanism that adjusts the distance between the first mold and the first plate.

Additionally, to achieve the aforementioned object, the tire curing apparatus of the present invention includes a first plate to which a first mold provided with a bladder that heats and pressurizes a green tire is attached, a second plate to which a second mold configured such that the bladder can be sandwiched between the first mold and the second mold in cooperation with the first mold is attached, a substantially cylindrical guide rod that is attached to the first plate and to the second plate and that guides relative movements of both the first plate and the second plate, a mold moving mechanism that relatively moves the first plate and the second plate along the guide rod, a mold pressurizing mechanism that applies pressure to both the first mold and the second mold that have been closed together and holds a closed state when the green tire is heated and pressurized by the bladder, and a clamping mechanism that fixes relative positions of both the first plate and the second plate and holds a closed state at a clamp position corresponding to a size of the first mold and the second mold that have been closed together when the green tire is heated and pressurized by the bladder, in which the clamping mechanism is composed of a clamp rod that is positioned at a surface, which faces the second plate, of the first plate, that is a substantially cylindrical body formed so as to protrude in a direction of the second plate, and that has a clamp groove serving as the clamp position and formed at a front-end side of the clamp rod and a clamp portion that is disposed at the second plate and that fixes relative positions of both the first plate and the second plate by being fitted to the clamp groove, or is composed of a clamp rod that is positioned at a surface, which faces the first plate, of the second plate, that is a substantially cylindrical body formed so as to protrude in a direction of the first plate, and that has a clamp groove serving as the clamp position and formed at a front-end side of the clamp rod and a clamp portion that is disposed at the first plate and that fixes relative positions of both the first plate and the second plate by being fitted to the clamp groove, and the clamp portion has a clamp-portion adjusting mechanism that is capable of changing a distance between the clamp portion and either the first plate or the second plate that is provided with the clamp portion.

Here, the clamp portion has the clamp-portion adjusting mechanism that is capable of changing a distance between the clamp portion and either the first plate or the second plate that is provided with the clamp portion, hence making it possible to change the position of the clamp portion fitted to the clamp groove by changing a distance between the clamp portion and the plate provided with the clamp portion. In other words, it becomes possible to adjust the clamp position by changing the position of the clamp portion in accordance with the size of the mold. As a result, it becomes possible to adjust the clamp position and the mold height position to each other only by a positional adjustment of the clamp portion. In other words, it is possible to control the clamp position only by a positional adjustment of the clamp portion, for example, without providing a mold-height adjusting mechanism that adjusts the distance between the first mold and the first plate.

Additionally, if the second plate is disposed above the first plate in the vertical direction and if the clamp portion is disposed at the second plate, it becomes possible to dispose the clamp adjusting mechanism at a position away from the bladder disposed at the first plate or from the mold that has been closed. As a result, a high temperature generated from the bladder or from the mold, the leakage of a curing medium, and the like do not easily affect the clamp adjusting mechanism, and it is possible to improve the durability of the clamp adjusting mechanism. Additionally, it becomes unnecessary to demount the bladder or the mold when the clamp adjusting mechanism breaks down and is repaired or checked, and hence it is possible to facilitate a maintenance task.

Additionally, if a plurality of clamp grooves are formed, it becomes possible to select an appropriate clamp groove matched to the mold height from among the plurality of clamp grooves along with the positional change of the clamp portion performed by the clamp adjusting mechanism, and it is possible to shorten a distance for the positional change of the clamp portion.

Additionally, if a position detecting means that is capable of detecting a clamp position corresponding to the size of the first mold and the second mold that have been closed together is provided, it is possible to select an appropriate clamp position from among a plurality of clamp positions on the basis of information about a position detected by the position detecting means. Additionally, if a mold-height adjusting mechanism that adjusts a distance between the first mold and the first plate is provided, it is possible to adjust the distance between the first mold and the first plate on the basis of information about a position detected by the position detecting means. In other words, for example, the behavior of the position detecting means, the behavior of selecting an appropriate clamp position from among a plurality of clamp positions and moving the first plate or the second plate, and the behavior of the mold-height adjusting mechanism are each automated, and, as a result, it is possible to automate the operation of adjusting the clamp position and the mold height position to each other after replacing the mold with a different mold.

Additionally, to achieve the aforementioned object, the tire curing apparatus of the present invention includes a first plate to which a first mold provided with a bladder that heats and pressurizes a green tire is attached, a second plate to which a second mold configured such that the bladder can be sandwiched between the first mold and the second mold in cooperation with the first mold is attached, a substantially cylindrical guide rod that is attached to the first plate and to the second plate, that guides relative movements of both the first plate and the second plate, and at which a clamp groove is formed, a mold moving mechanism that relatively moves the first plate and the second plate along the guide rod, a mold pressurizing mechanism that applies pressure to both the first mold and the second mold that have been closed together and holds a closed state when the green tire is heated and pressurized by the bladder, a clamp portion that is disposed at at-least either one of the first plate and the second plate, that is fitted to the clamp groove, and that fixes relative positions of both the first plate and the second plate and holds a closed state at a clamp position corresponding to a size of the first mold and the second mold that have been closed together when the green tire is heated and pressurized by the bladder, and a guide-rod adjusting mechanism that is capable of changing a position of the guide rod with respect to the first plate along a longitudinal direction of the guide rod.

Here, it becomes possible to change the position of the clamp groove by changing the position of the guide rod by means of the guide rod at which a clamp groove is formed, the clamp portion that is fitted to the clamp groove and that fixes relative positions of both the first plate and the second plate and holds a closed state at a clamp position corresponding to a size of the first mold and the second mold that have been closed together when the green tire is heated and pressurized by the bladder, and the guide-rod adjusting mechanism that is capable of changing a position of the guide rod with respect to the first plate along a longitudinal direction of the guide rod. In other words, it becomes possible to adjust the clamp position by changing the position of the guide rod with respect to the first plate in accordance with the size of the mold. As a result, it becomes possible to adjust the clamp position and the mold height position to each other only by a positional adjustment of the guide rod. Additionally, the position of the guide rod can be changed, and therefore it is possible to adjust the clamp position and the mold height position to each other only by providing the guide rod with one clamp groove.

Additionally, to achieve the aforementioned object, the tire curing method of the present invention includes a mold closing step of relatively moving a first plate to which a first mold provided with a bladder that heats and pressurizes a green tire is attached and a second plate to which a second mold configured such that the bladder can be sandwiched between the first mold and the second mold in cooperation with the first mold is attached along a guide rod attached to the first plate and to the second plate and closing the first mold and the second mold together, and a clamping step of fixing relative positions of both the first plate and the second plate and holding a closed state at a clamp position corresponding to a size of the first mold and the second mold that have been closed together, in which the clamping step is configured to provide a plurality of the clamp positions and to be capable of selecting a to-be-used position from among the clamp positions in accordance with a size of the first mold and the second mold that have been closed together.

Here, the clamping step is configured to provide a plurality of the clamp positions and to be capable of selecting a to-be-used position from among the clamp positions in accordance with a size of the first mold and the second mold that have been closed together, and therefore it becomes possible to set a mold height position in accordance with a clamp position without greatly changing the height position of the mold when the mold is replaced by another mold having a different size. In other words, if the replacement of a mold by another mold having a different size is made so that the size of a mold is changed when the mold is closed in the single tire curing apparatus, the operation of adjusting a clamp position and a mold height position to each other is required. In this operation, if a position that matches the size of a mold is selected from among a plurality of clamp positions, it becomes unnecessary to make a positional adjustment only by changing the mold height position. As a result, for example, when the height position of a mold consisting of upper and lower molds is changed by raising the lower mold, the distance by which the lower mold rises becomes shorter, hence making it possible to lower the height position of the mold from a floor surface or the like on which the tire curing apparatus is placed. Additionally, it is possible to reduce the size of the entire tire curing apparatus.

Additionally, if the clamping step includes a step of changing a distance between the first mold and the first plate and adjusting the size of the first mold and the second mold that have been closed together, it becomes possible to adjust the clamp position and the mold height position to each other by changing the distance between the first mold and the first plate when the mold is replaced by another mold having a different size. Additionally, it is possible to select the clamp position from among a plurality of positions as described above, and therefore it becomes possible to shorten the length of a to-be-changed distance when the distance between the first mold and the first plate is changed.

Additionally, if the guide rod has clamp grooves serving as the clamp positions, respectively, formed at a plurality of mutually different positions in a longitudinal direction of the guide rod, and if a clamp portion that fixes relative positions of both the first plate and the second plate by being fitted to the clamp groove is formed at at-least either one of the first plate and the second plate, and if the clamping step includes a step of changing a position of the guide rod with respect to the first plate along the longitudinal direction of the guide rod, it becomes possible to change the position of the clamp groove by changing the position of the guide rod. In other words, it becomes possible to adjust the clamp position by changing the position of the guide rod with respect to the first plate in accordance with the size of the mold. As a result, it becomes possible to adjust the clamp position and the mold height position to each other only by a positional adjustment of the guide rod. In other words, it is possible to control the clamp position only by a positional adjustment of the guide rod, for example, without providing a mold-height adjusting mechanism that adjusts the distance between the first mold and the first plate. Additionally, the guide rod is provided with a plurality of clamp grooves, and therefore it is also possible to shorten a distance for the positional adjustment of the guide rod.

Additionally, to achieve the aforementioned object, the tire curing method of the present invention includes a mold closing step of relatively moving a first plate to which a first mold provided with a bladder that heats and pressurizes a green tire is attached and a second plate to which a second mold configured such that the bladder can be sandwiched between the first mold and the second mold in cooperation with the first mold is attached along a guide rod attached to the first plate and to the second plate and closing the first mold and the second mold together, and a clamping step of fixing relative positions of both the first plate and the second plate and holding a closed state at a clamp position corresponding to a size of the first mold and the second mold that have been closed together, in which a clamp groove serving as the clamp position is formed at the guide rod, a clamp portion that fixes relative positions of both the first plate and the second plate by being fitted to the clamp groove is formed at at-least either one of the first plate and the second plate, and the clamping step has a step of changing a distance between the clamp portion and either the first plate or the second plate that is provided with the clamp portion.

Here, the clamping step has the step of changing a distance between the clamp portion and either the first plate or the second plate that is provided with the clamp portion, and therefore it becomes possible to adjust the clamp position and the mold height position to each other by changing the distance between the clamp portion and the plate provided with the clamp portion when the mold is replaced by another mold having a different size.

Additionally, to achieve the aforementioned object, the tire curing method of the present invention includes a mold closing step of relatively moving a first plate to which a first mold provided with a bladder that heats and pressurizes a green tire is attached and a second plate to which a second mold configured such that the bladder can be sandwiched between the first mold and the second mold in cooperation with the first mold is attached along a guide rod attached to the first plate and to the second plate and closing the first mold and the second mold together, and a clamping step of fixing relative positions of both the first plate and the second plate and holding a closed state at a clamp position corresponding to a size of the first mold and the second mold that have been closed together, in which the clamping step has a step of fixing relative positions of both the first plate and the second plate by fitting a clamp groove formed at a front end of a substantially cylindrical clamp rod disposed at the first plate to a clamp portion disposed at the second plate, or a step of fixing relative positions of both the first plate and the second plate by fitting a clamp groove formed at a front end of a substantially cylindrical clamp rod disposed at the second plate to a clamp portion disposed at the first plate, and a step of changing a distance between the clamp portion and either the first plate or the second plate that is provided with the clamp portion.

Here, the clamping step has the step of changing a distance between the clamp portion and either the first plate or the second plate that is provided with the clamp portion, and therefore it becomes possible to adjust the clamp position and the mold height position to each other by changing the distance between the clamp portion and the plate provided with the clamp portion when the mold is replaced by another mold having a different size.

Advantageous Effects of Invention

The tire curing apparatus according to the present invention is an apparatus that is capable of corresponding to various mold heights although its mechanism is simple, that is capable of reducing its apparatus size, and that is excellent in handleability.

The tire curing method according to the present invention is a method of performing tire curing by use of a tire curing apparatus that is capable of corresponding to various mold heights although its mechanism is simple, that is capable of reducing its apparatus size, and that is excellent in handleability.

DESCRIPTION OF EMBODIMENTS

Figure 1A:
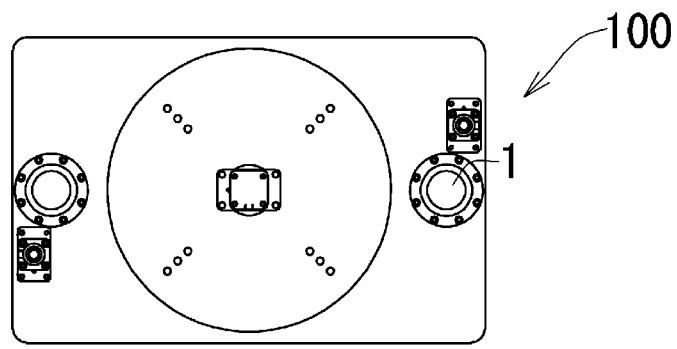
FIG. 1A is a schematic plan view showing a structure of a conventional tire curing apparatus.
Figure 1B:
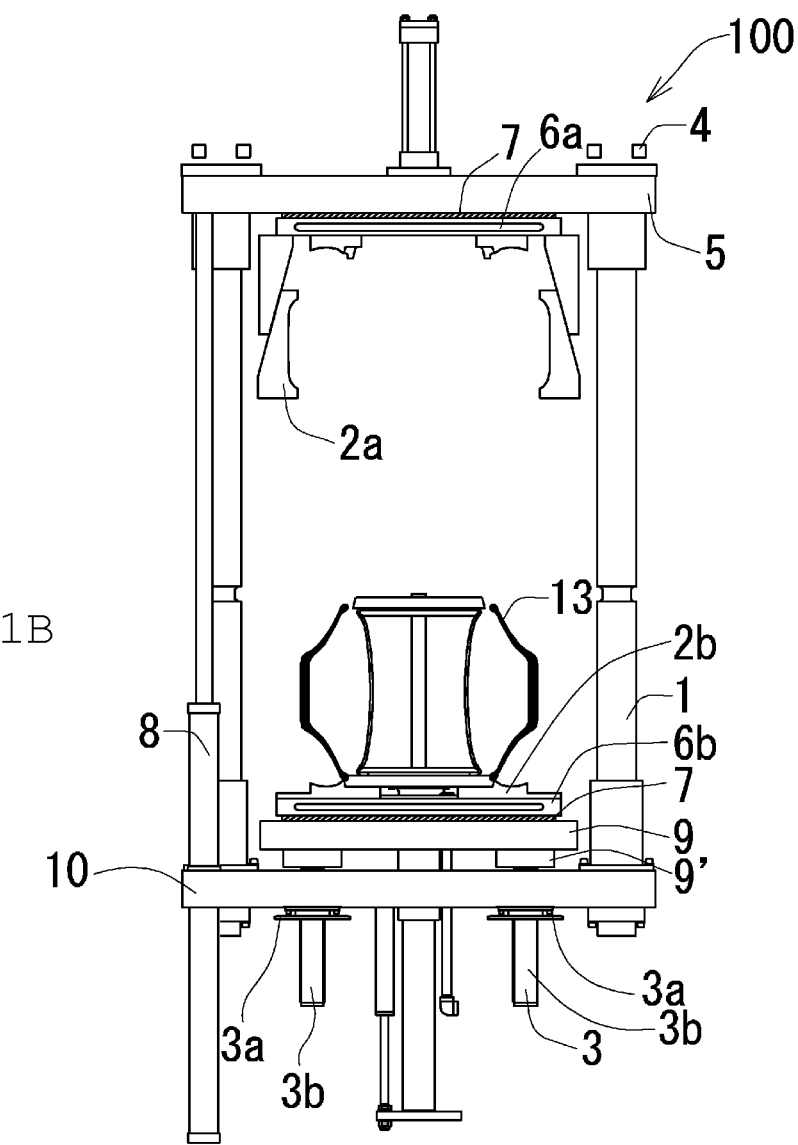
FIG. 1B is a schematic front view showing the structure of the tire curing apparatus shown in FIG. 1A.
Figure 2A:
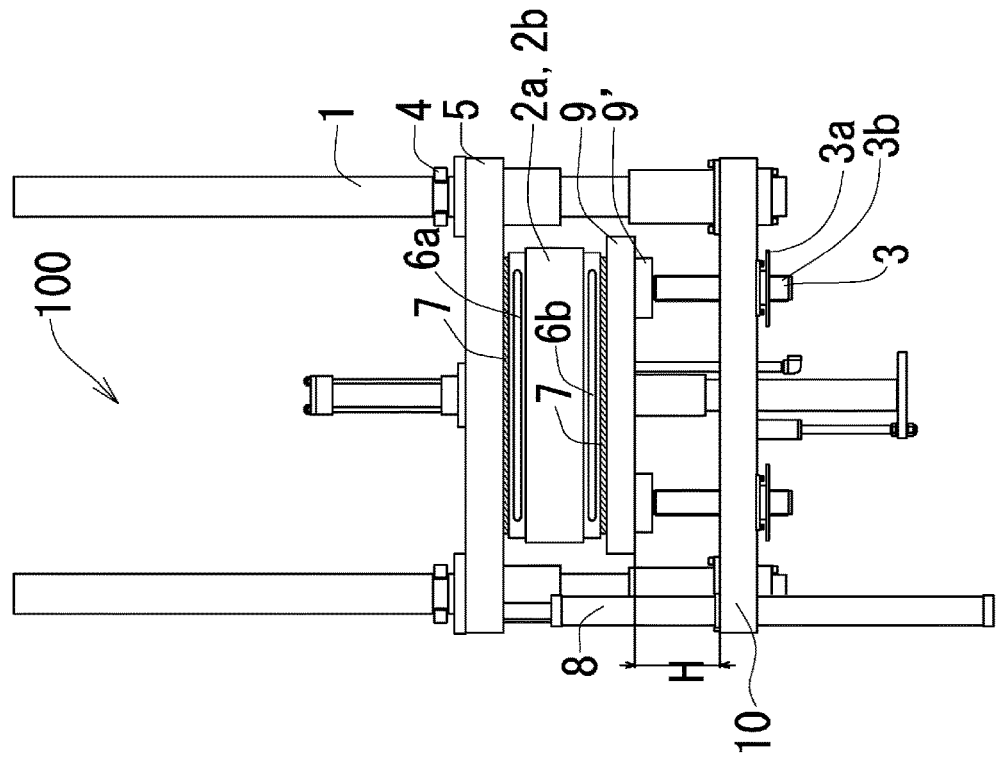
FIG. 2A is a schematic front view showing a state in which a mold whose mold thickness is largest has been closed in a conventional tire curing apparatus.
Figure 2B:
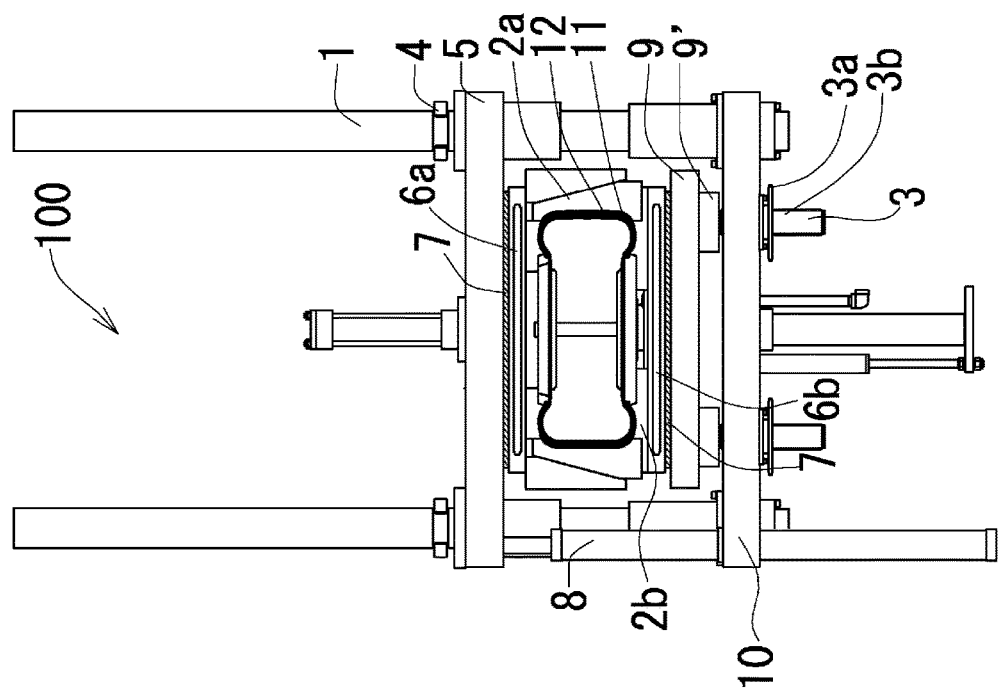
FIG. 2B is a schematic front view showing a state in which a mold whose mold thickness is smallest has been closed in the conventional tire curing apparatus.

Modes for carrying out the invention (which are hereinafter referred to simply as "embodiments") will be hereinafter described with reference to the drawings.

In all of the drawings to describe embodiments, the same or related reference sign is given to a functionally equivalent component, and a repetitive description of this component is omitted. The same applies to not only drawings that depict structures of embodiments of the present invention but also drawings that depict conventional apparatus structures.

Additionally, in the following description, a direction substantially parallel to a longitudinal direction of a guide rod 1 is referred to as an "up-down direction" or "vertical direction" on the basis of FIG. 3B. Additionally, the position of a lower plate 10 with respect to an upper plate 5 is referred to as a "downward side (vertically downward side)" or "lower side" in the up-down direction (in the vertical direction) on the basis of FIG. 3B, and the position of the upper plate 5 with respect to the lower plate 10 is referred to as an "upward side (vertically upward side)" or "upper side" in the up-down direction (in the vertical direction) on the basis of FIG. 3B.

Additionally, in the following description, a direction substantially perpendicular to the up-down direction (vertical direction) is referred to as a left-right direction on the basis of FIG. 3B. Additionally, the position of a bladder 11a with respect to two guide rods 1 is referred to as "inside" or "inner side," and the positions of the two guide rods 1 with respect to the bladder 11a are each referred to as "outside" or "outer side" in the left-right direction on the basis of FIG. 3B.

First Embodiment

A first embodiment of the present invention will be described with reference to FIG. 3 and FIG. 4.

Figure 3A:
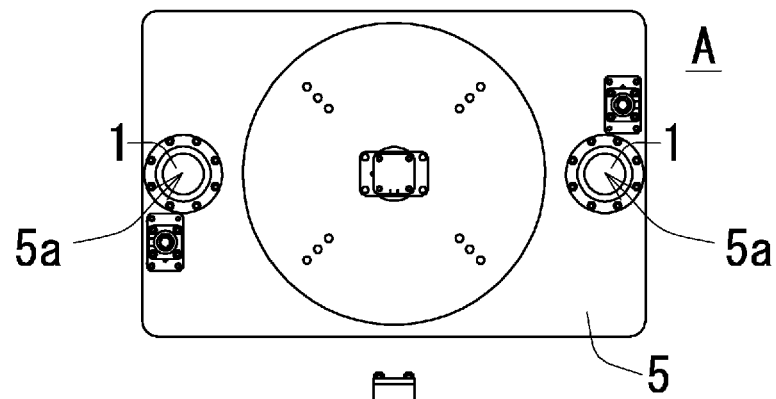
FIG. 3A is a schematic plan view showing a structure of a first embodiment of a tire curing apparatus to which the present invention is applied.
Figure 3B:
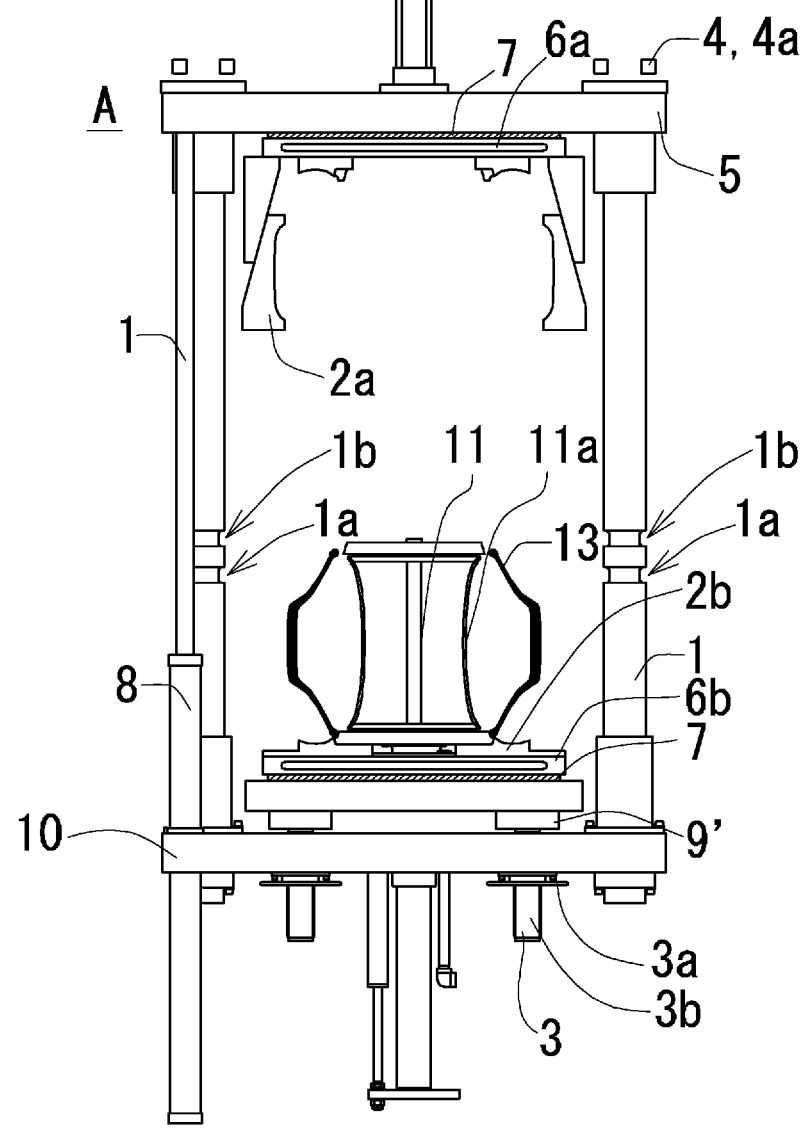
FIG. 3B is a schematic front view of the tire curing apparatus shown in FIG. 3A.

FIG. 3A is a schematic plan view showing a structure of a first embodiment of a tire curing apparatus to which the present invention is applied, and FIG. 3B is a schematic front view of the tire curing apparatus shown in FIG. 3A. The structure shown below is an example of the present invention, and the contents of the present invention are not limited to this.

A tire curing apparatus A that is the first embodiment of the tire curing apparatus to which the present invention is applied is composed of two guide rods 1, a mold 2 consisting of an upper mold 2a and a lower mold 2b, an upper plate 5, a lower plate 10, and an upper-mold raising/lowering device 8 as shown in FIG. 3A and FIG. 3B.

The upper mold 2a mentioned here corresponds to a second mold defined in the claims of the present application, and the lower mold 2b corresponds to a first mold defined in the claims of the present application. Additionally, the upper plate 5 mentioned here corresponds to a second plate defined in the claims of the present application, and the lower plate 10 corresponds to a first plate defined in the claims of the present application. Additionally, the upper-mold raising/lowering device 8 mentioned here corresponds to a mold moving mechanism defined in the claims of the present application.

The guide rod 1 is a substantially cylindrical rod-shaped body that connects the upper plate 5 and the lower plate 10 together, and is a component that guides a movement that raises and lowers the upper plate 5 through the upper-mold raising/lowering device 8.

The upper plate 5 is a plate-shaped component that attaches the upper mold 2a through a thermal insulation plate 7 and an upper heat plate 6a. Additionally, the upper plate 5 can ascend and descend through the upper-mold raising/lowering device 8 as described above, and is configured to be capable of changing the distance between the upper plate 5 and the lower plate 10. In other words, the upper plate 5 and the upper mold 2a ascend and descend in a mutually united state, and serve to close and unclose the upper mold 2a and the lower mold 2b together.

Additionally, the upper plate 5 has a clamping device 4 (see FIG. 3 and FIG. 4). The clamping device 4 is formed of a clamp block 4a, and is a component that fixes the upper plate 5 by being fitted to a clamp groove 1a or a clamp groove 1b described later. The clamp block 4a mentioned here corresponds to a clamp portion defined in the claims of the present application. Additionally, the clamp block 4a and either the clamp groove 1a or the clamp groove 1b mentioned here correspond to a clamping mechanism defined in the claims of the present application.

In other words, the clamp block 4a is, along with the clamp groove 1a or the clamp groove 1b, a constituent of a clamping mechanism that fixes the upper plate 5 at a tire curing position and holds the pressurizing force of the mold 2. A known structure provided in the conventional tire curing apparatus (see Patent Literature 2, for example) can be employed as a structure in which the upper plate 5 is fixed by fitting the clamp block 4a to either the clamp groove 1a or the clamp groove 1b, and therefore a detailed description of its contents is omitted.

The lower plate 10 is a tabular component by which the lower mold 2b is attached through the screw 3b, which is a constituent of the mold-height adjusting mechanism 3, a mold pressurizing mechanism 9', the thermal insulation plate 7, and the lower heat plate 6b. The lower plate 10 is one of a pair consisting of the upper plate 5 and the lower plate 10, and is a component that performs the closing of the mold 2 between these plates. Additionally, the lower plate 10 serves as a component that clamps the mold 2 in order to hold the pressurizing force of the mold 2 that has been closed in cooperation with the upper plate 5.

The tire curing apparatus A has the mold-height adjusting mechanism 3. The mold-height adjusting mechanism 3 is a mechanism that changes the height position of the lower mold 2b with respect to the lower plate 10 in the up-down direction.

The mold-height adjusting mechanism 3 of the tire curing apparatus A has the same structure as that of the tire curing apparatus 100 mentioned above. However, the mold-height adjusting mechanism 3 of the tire curing apparatus A is provided with a plurality of clamp grooves of both the clamp groove 1a and the clamp groove 1b, and, as a result, the distance by which the lower mold 2b ascends and descends is made shorter than the distance by which the lower mold 2b in the mold-height adjusting mechanism 3 of the tire curing apparatus 100 ascends and descends.

The tire curing apparatus A has the mold pressurizing mechanism 9'. The mold pressurizing mechanism 9' is a component that applies pressure onto the mold 2, which has been closed, from outside and that holds the pressurizing force of the mold 2.

Figure 14A:
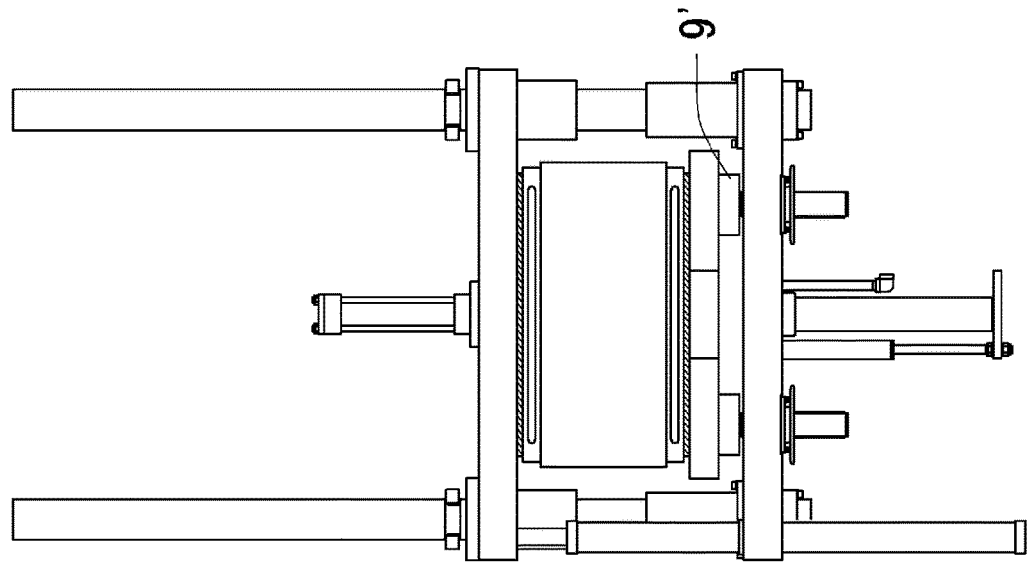
FIG. 14A is a schematic front view of a tire curing apparatus in which a pressurizing mechanism has a doughnut-type cylinder.
Figure 14B:
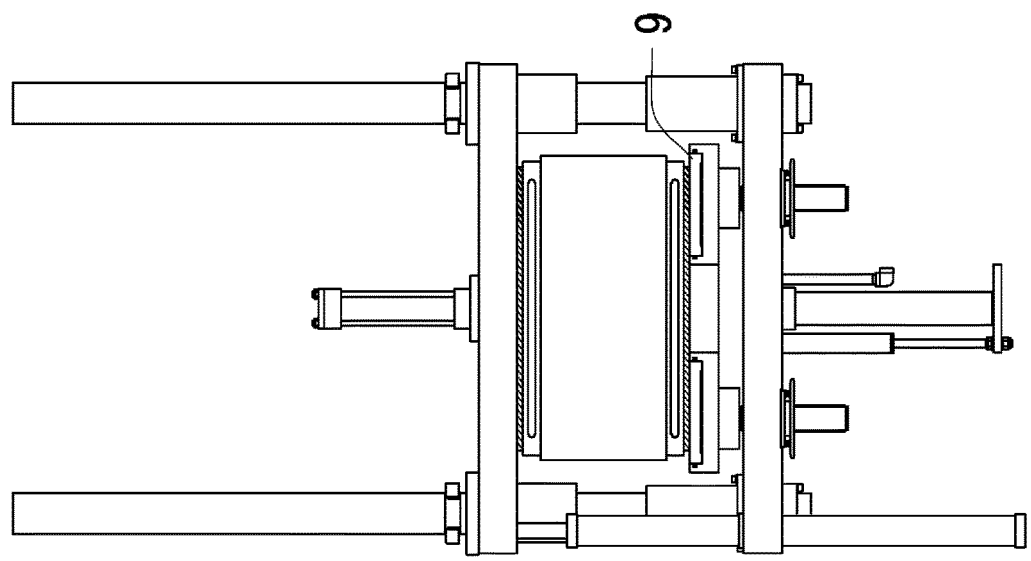
FIG. 14B is a schematic front view of a tire curing apparatus in which a pressurizing mechanism has a hydraulic-type cylinder.

Additionally, the mold pressurizing mechanism 9' is formed of a hydraulic cylinder attached to the lower mold 2a through the screw 3b. A known structure provided in the conventional tire curing apparatus can be employed as a mold pressurizing mechanism formed of a hydraulic cylinder, and therefore a detailed description of its contents is omitted (see FIG. 14B).

Additionally, in the present invention, a doughnut-type mold pressurizing mechanism 9 (see FIG. 14A) in which a cylinder piston is formed in the shape of a hollow doughnut, in which the area is greater than the inner/outer-diameter area of a maximum outer-diameter tire, and in which pressurization is performed with a compressed gas, such as nitrogen or air, can also be employed as the mold pressurizing mechanism.

Additionally, in the present invention, a structure in which a mold pressurizing mechanism is provided at an upper portion of a mold can also be employed. Additionally, a method in which a hydraulic cylinder, which serves as the mold pressurizing mechanism, is disposed at a lower end of a guide rod and in which a pressurizing force is applied to the mold by pulling the guide rod down after performing clamping can also be employed.

The guide rod 1 has its lower-end side fixed to the lower plate 5. Additionally, the upper-end side of the guide rod 1 is inserted in a through-hole 5a formed in the upper plate 5 (see FIG. 3A). Additionally, the upper-mold raising/lowering device 8 is formed of a hydraulic cylinder.

Additionally, two clamp grooves, i.e., the clamp groove 1a (lower side) and the clamp groove 1b (upper side) are formed on an outer peripheral surface of the guide rod 1 and on a path along which the upper plate 5 moves (see FIG. 3B). The clamp groove 1a and the clamp groove 1b are each a part at which the aforementioned clamp block 4a is fitted thereto, and hence the position in the up-down direction of the upper plate 5 is fixed.

Additionally, the clamp groove 1a is a groove portion that serves as a clamp position when the mold 2 (minimum-thickness mold) whose mold height becomes smallest is used. In other words, the clamp groove 1a is a groove portion formed to fix the position of the upper plate 5 in the up-down direction with respect to the mold 2 whose mold thickness becomes smallest when closed.

Additionally, the clamp groove 1b is a groove portion that serves as a clamp position when the mold 2 (maximum-thickness mold) whose mold height becomes largest is used. In other words, the clamp groove 1b is a groove portion formed to fix the position of the upper plate 5 in the up-down direction with respect to the mold 2 whose mold thickness becomes largest when closed.

Here, the upper mold 5 is not necessarily required to be configured such that the upper mold 5 can ascend and descend by means of the upper-mold raising/lowering device 8, and all that is required is to enable the mold 2 to be closed and is to have a structure in which the mold 2 that has been closed can be clamped by the upper and lower plates. In other words, the mechanism is not required to be limited to a mechanism in which the upper mold 5 is raised and lowered with respect to the lower mold 10 that has been fixed. For example, a structure in which the lower mold 10 is raised and lowered through a mold raising/lowering device in a state in which the upper mold 5 has been fixed may be employed.

Additionally, the upper-mold raising/lowering device 8 is not necessarily required to be formed of a hydraulic cylinder, and another mechanism may be employed as long as the upper mold 5 can ascend and descend. For example, the structure may be formed so as to raise and lower the upper plate 5 in accordance with a motor-drive screw method created by combining a motor with a screw structure.

Additionally, although a plurality of clamp grooves are formed at the guide rod 1 in accordance with the size (mold height) of a mold that is attachable to the tire curing apparatus A, specific limitations are not imposed on the number of clamp grooves as long as the number thereof is two or more. In the structure of the present invention, it is also possible to form three or more clamp grooves at the guide rod as long as the clamp grooves are within a range that corresponds to the size of a mold to be used and within which the strength of the guide rod can be secured.

Additionally, the clamp groove 1a is not necessarily required to serve as a clamp position when the mold 2 (minimum-thickness mold) whose mold height becomes smallest is used. For example, the structure may be formed so that the clamp groove 1a is formed at the guide rod in accordance with a mold that has a mold height falling within a range within which the mold is attachable to the tire curing apparatus A and whose mold height exceeds a minimum value of the range.

Additionally, the clamp groove 1b is not necessarily required to serve as a clamp position when the mold 2 (maximum-thickness mold) whose mold height becomes largest is used. For example, the structure may be formed so that the clamp groove 1b is formed at the guide rod in accordance with a mold that has a mold height falling within a range within which the mold is attachable to the tire curing apparatus A and whose mold height is less than a maximum value of the range.

Figure 4A:
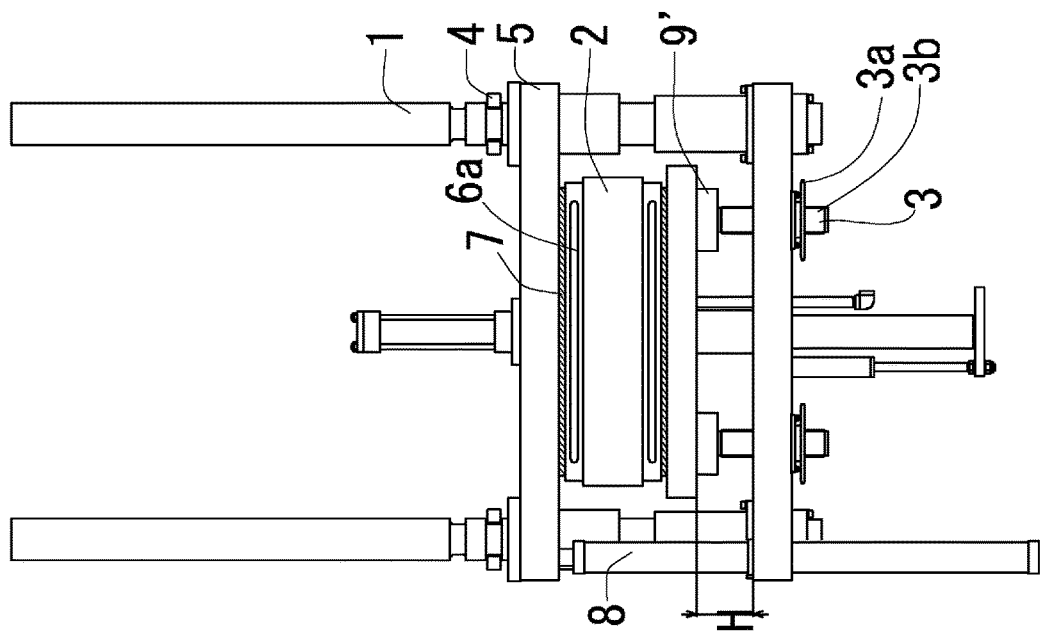
FIG. 4A is a schematic front view showing a state in which a mold whose mold thickness is largest has been closed in the tire curing apparatus shown in FIG. 3A.
Figure 4B:
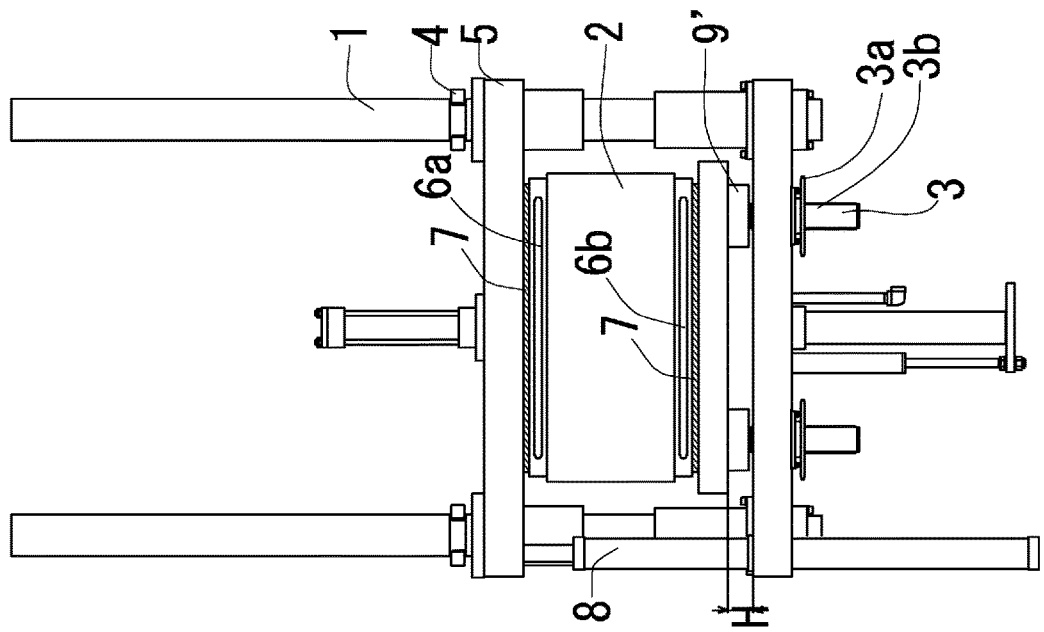
FIG. 4B is a schematic front view showing a state in which a mold whose mold thickness is smallest has been closed in the tire curing apparatus shown in FIG. 3A.

As shown in FIG. 3B, the upper mold 2a and the lower mold 2b are respectively components that serve as a pair and of which the mold 2 consists (see FIG. 4A and FIG. 4B). The upper mold 2a and the lower mold 2b are closed together, and a green tire 13 placed thereinside is heated and pressurized.

More specifically, the bladder 11a is disposed between the upper mold 2a and the lower mold 2b. The bladder 11a is a component that supports a green tire 13 and a cured tire and that undertakes to perform tire molding under the conditions of high temperature and high pressure while pressing the green tire 13 against the mold 2.

Additionally, the bladder 11a is configured to be supplied with a curing medium from a curing-medium supply source (not shown) to its inside and to be freely expanded and contracted. In tire curing, the green tire 13 that has been held by the bladder 11a from its inner-peripheral-surface side is covered with the upper mold 2a and the lower mold 2b.

Additionally, the tire curing apparatus A has a bladder raising/lowering device 11. The bladder raising/lowering device 11 is a device that changes a height position in the up-down direction while raising and lowering the bladder 11a in a tire curing process. The bladder raising/lowering device 11 is configured so that its movement can be controlled in conjunction with the movement of the upper-mold raising/lowering device 8.

Here, the guide rod 1 is not necessarily required to be employed as a component that guides the ascent and descent of the upper plate 5, and a component other than the guide rod 1 may be employed as long as the structure is formed so that the ascent and descent of the upper plate 5 can be guided and so that a plurality of clamp grooves can be formed. For example, in a structure in which an upper plate is guided through a guide rail or a guide groove in a conventional plate-type tire curing apparatus, it is also possible to employ a structure in which a plurality of clamp grooves are formed at the guide rail or at the guide groove.

A description will be given of the contents of a series of operations that perform tire curing by means of the tire curing apparatus A that is the first embodiment of the present invention described above.

First, the green tire 13 is held by a tire loading device (not shown), and the tire loading device descends to attach the green tire 13 to the outside of the bladder 11a.

Additionally, the upper plate 5 is lowered along the guide rod 1 by means of the upper-mold raising/lowering device 8, and the upper mold 2a and the lower mold 2b are engaged with each other, and are closed together (closing of the mold 2). The upper plate 5 is lowered, and the clamp block 4a of the upper plate 5 is fitted to the clamp groove 1a or the clamp groove 1b of the guide rod 1 selected in accordance with the height of the mold 2.

FIG. 4A shows a state in which the position of the upper plate 5 in the up-down direction has been fixed by the clamping mechanism by allowing the clamp block 4a of the upper plate 5 to be fitted to the clamp groove 1b of the guide rod 1 (the thickness of the mold 2 becomes largest, i.e., the height of the mold 2 becomes largest).

Additionally, FIG. 4B shows a state in which the position of the upper plate 5 in the up-down direction has been fixed by the clamping mechanism by allowing the clamp block 4a of the upper plate 5 to be fitted to the clamp groove 1a of the guide rod 1 (the thickness of the mold 2 becomes smallest, i.e., the height of the mold 2 becomes smallest).

In other words, the upper mold 2a and the lower mold 2b are engaged with each other and are closed together, and then the clamp block 4a of the upper plate 5 is fitted to the clamp groove 1a or the clamp groove 1b of the guide rod 1, and the mold 2 is clamped by the upper plate 5 and the lower plate 10.

Additionally, the inside of the bladder 11a is supplied with a curing heat medium, such as steam, and is expanded along the inside of the green tire 13. Additionally, the bladder 11a is lowered to a fully closed position of the mold 2 through the bladder raising/lowering device 11 synchronizedly with a downward movement of the upper mold 5a.

The mold 2 is closed and clamped, and then the mold 2 is pressurized by a pressure device 9'. Additionally, the green tire 13 is heated from outside through the upper and lower heat plates 6a and 6b from the outer peripheral side of the mold 2. Additionally, a curing heat medium, such as steam, is supplied into the bladder 11a, and the green tire 13 is pressed against the inner surface of the mold 2, and is pressurized while being heated from inside, and tire curing is started.

After ending the tire curing, the pressure of the pressure device 9' is reduced, and pressurization is released from its held state, and the clamp block 4a and either the clamp groove 1a or the clamp groove 1b are disengaged from each other. Additionally, the tire that has already been cured is released from a closed state by raising the upper mold 2a.

Additionally, the bladder 11a is peeled from the tire by means of the bladder raising/lowering device 11, and the tire is taken out of the tire curing apparatus A by means of a tire taking-out device (not shown), and is moved to a subsequent process step. The tire curing of the green tire in the tire curing apparatus A is finished through this process flow.

Next, a description will be given of an example of a working procedure performed when a mold is replaced by another mold differing in size in the tire curing apparatus A that is the first embodiment of the present invention.

First, in order to install a mold by which the previous mold is replaced, the screw 3b of the mold-height adjusting mechanism 3 is lowered to a lowest limit. If the height of the mold by which the previous mold is replaced is beforehand known, the mold-height adjusting mechanism 3 is beforehand lowered so that the screw 3b is placed below the position of a clamp groove to be used during clamping.

Next, the upper plate 5 is lowered to a mold closing position by means of the upper-mold raising/lowering device 8. Here, the mold closing position can be detected by pressure or position control if the upper-mold raising/lowering device 8 is a device formed of a hydraulic cylinder. Additionally, the mold closing position can be detected by torque control or position control if the upper-mold raising/lowering device 8 is an electrically-driven device.

Thereafter, the processing force of the upper plate 5 is made free (a state in which pressure is not applied by the pressurizing mechanism 9'), and the lower mold 2b is pushed up by means of the mold-height adjusting mechanism 3. The upper mold 2a is pushed up by means of the lower mold 2b, and a projection (not shown) provided at the upper plate 5 is detected by a sensor (not shown) provided at the position of the clamp groove of the guide rod 1 when the projection arrives at the clamp position (clamp groove). In other words, the projection is detected by the sensor, hence making it possible to detect the clamp groove.

Next, the clamp block 4a of the clamping device is fitted to the clamp groove, and, after ascertaining this fitness, pressure is introduced into the pressurizing mechanism 9', and it is ascertained by a pressure sensor provided in the pressurizing mechanism 9' that the mold, by which the previous mold has been replaced, is normally pressurized. If it is ascertained that the mold, by which the previous mold has been replaced, has been pressurized, the mold replacing operation in the tire curing apparatus A is finished.

Apart of the mold replacement operation described above is automated, and yet may be manually performed by an operator.

In the tire curing apparatus A that is the first embodiment of the present invention described above, it is possible to select the clamp groove 1a or the clamp groove 1b formed at the guide rod 1 in accordance with the height of the mold 2 to be used.

In other words, it is possible to clamp the mold 2, which has been closed, by means of the clamping device 4 at an appropriate clamp position. As a result, the distance by which the mold-height adjusting mechanism 3 raises the lower mold 2b is shortened, hence making it possible to configure the tire curing apparatus so that the height position of the mold 2 from the floor surface on which the tire curing apparatus A is placed does not become extremely high.

Additionally, the apparatus has a simple structure in which a plurality of clamp grooves are formed at the guide rod 1. Therefore, it is possible to realize an apparatus configuration without greatly rearranging existing pieces of equipment.

Second Embodiment

A second embodiment of the present invention will be described with reference to FIG. 7 and FIG. 8. In the following description, the second embodiment is described while focusing on parts differing from those of the aforementioned first embodiment, and an overlapping description of the same component is omitted.

Figure 7A:
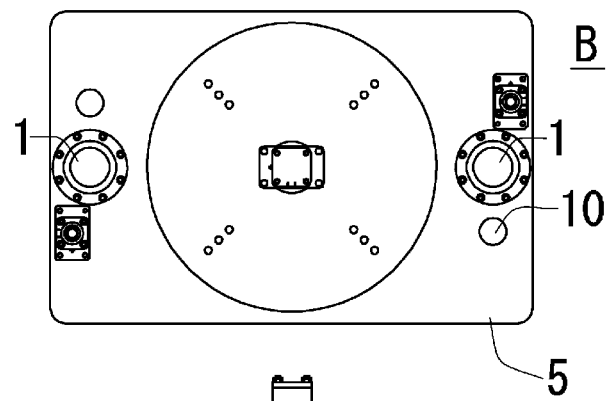
FIG. 7A is a schematic plan view showing a structure of a second embodiment of a tire curing apparatus to which the present invention is applied.
Figure 7B:
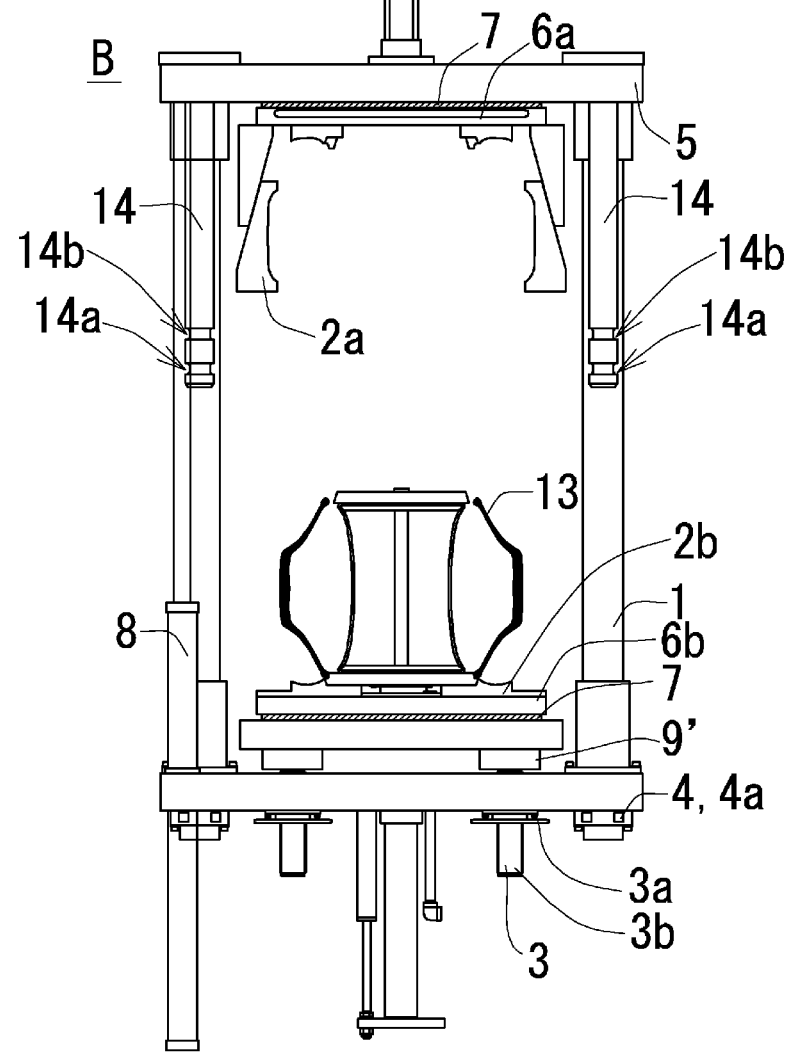
FIG. 7B is a schematic front view of the tire curing apparatus shown in FIG. 7A.
Figure 8A:
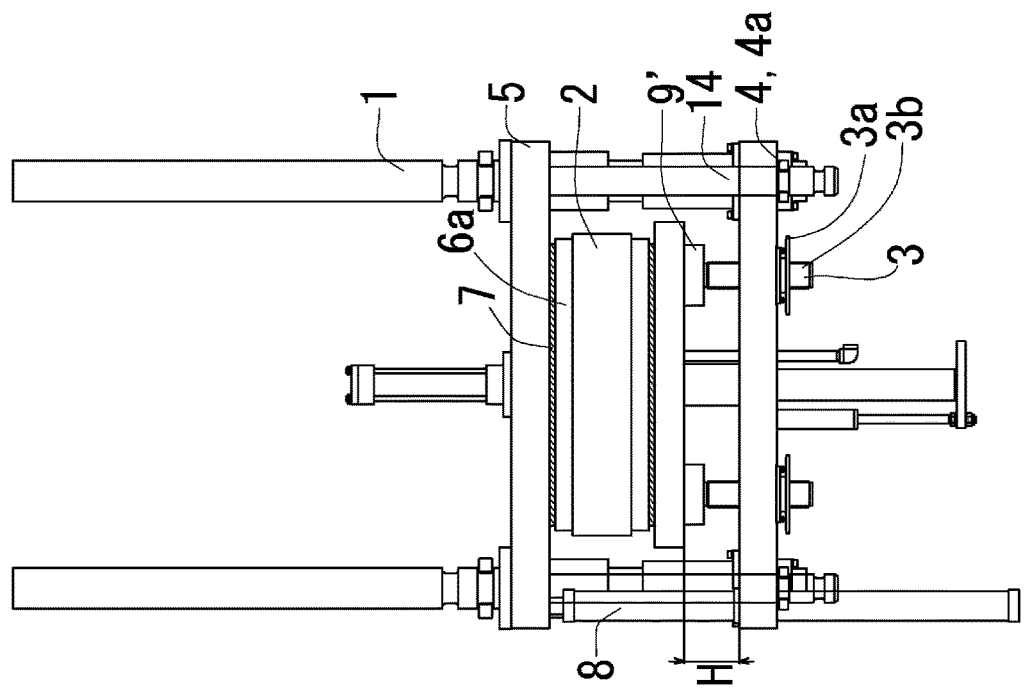
FIG. 8A is a schematic front view showing a state in which a mold whose mold thickness is largest has been closed in the tire curing apparatus shown in FIG. 7A.
Figure 8B:
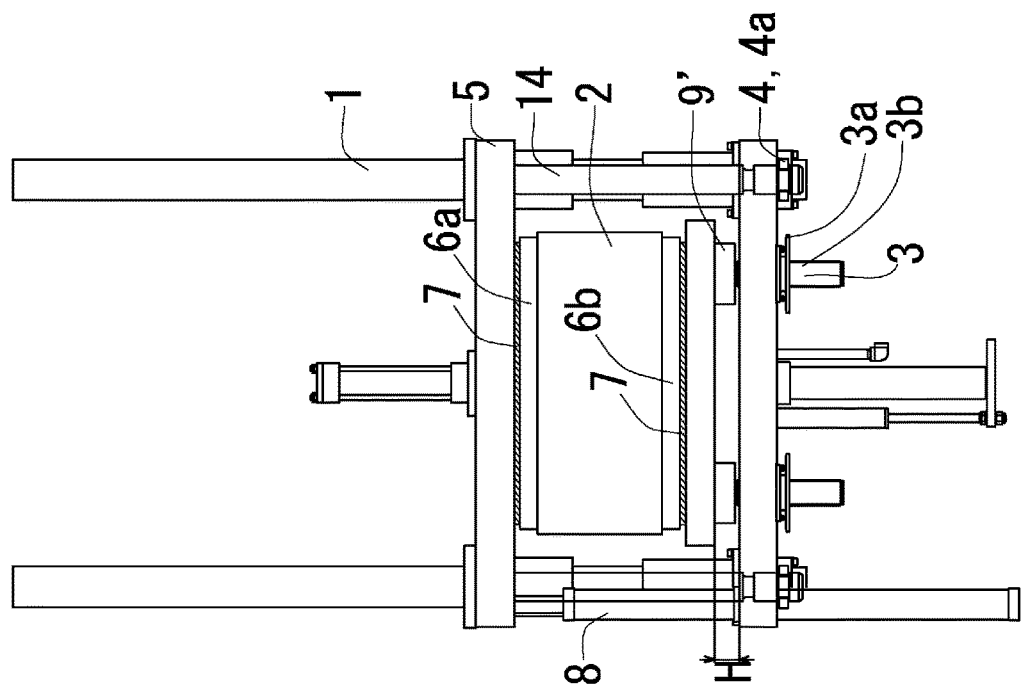
FIG. 8B is a schematic front view showing a state in which a mold whose mold thickness is smallest has been closed in the tire curing apparatus shown in FIG. 7A.

FIG. 7A is a schematic plan view showing a structure of the second embodiment of a tire curing apparatus to which the present invention is applied, and FIG. 7B is a schematic front view of the tire curing apparatus shown in FIG. 7A.

A tire curing apparatus B that is the second embodiment of the tire curing apparatus to which the present invention is applied includes two clamp rods 14 as shown in FIG. 7A and FIG. 7B.

The clamp rod 14 is a substantially cylindrical rod-shaped body having an upper end side fixed to the upper plate 5, and is a component that fixes the upper plate 5 by allowing a clamp groove 14a (lower side) or a clamp groove 14b (upper side) formed at a lower end side of the clamp rod 14 to be fitted to the clamp block 4a disposed at the lower plate 10. The clamp block 4a and either the clamp groove 14a or the clamp groove 14b mentioned here correspond to a clamping mechanism defined in the claims of the present application.

Additionally, the clamp groove 14a is a groove portion that serves as a clamp position when the mold 2 (maximum-thickness mold) whose mold height becomes largest is used. In other words, the clamp groove 14a is a groove portion formed to fix the position of the upper plate 5 in the up-down direction with respect to the mold 2 whose mold thickness becomes largest when closed (see FIG. 8A).

Additionally, the clamp groove 14b is a groove portion that serves as a clamp position when the mold 2 (minimum-thickness mold) whose mold height becomes smallest is used. In other words, the clamp groove 14b is a groove portion formed to fix the position of the upper plate 5 in the up-down direction with respect to the mold 2 whose mold thickness becomes smallest when closed (see FIG. 8B).

Additionally, in the tire curing apparatus B, a clamp groove is not formed at the guide rod 1 unlike the tire curing apparatus A. In other words, in the tire curing apparatus B, the structure is formed so that the upper plate 5 is fixed by fitting the clamp groove 14a or the clamp groove 14b of the clamp rod 14 and the clamp block 4a, which is a constituent of the clamping device 4 of the lower plate 10, together, and as a result, the pressurizing force of the mold 2 is held during tire curing.

In the tire curing apparatus B, the upper plate 5 is lowered through the upper-mold raising/lowering device 8, and, as a result, the clamp rod 14 is also lowered, and the clamp groove 14a or the clamp groove 14b formed at its lower end side is fitted to the clamp block 4a.

Figure 5A:
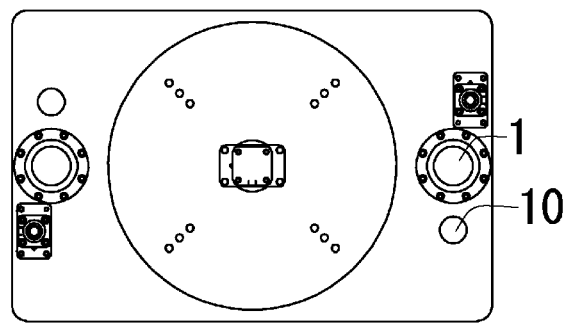
FIG. 5A is a schematic plan view showing a structure of a tire curing apparatus that has a conventional clamp rod.
Figure 5B:
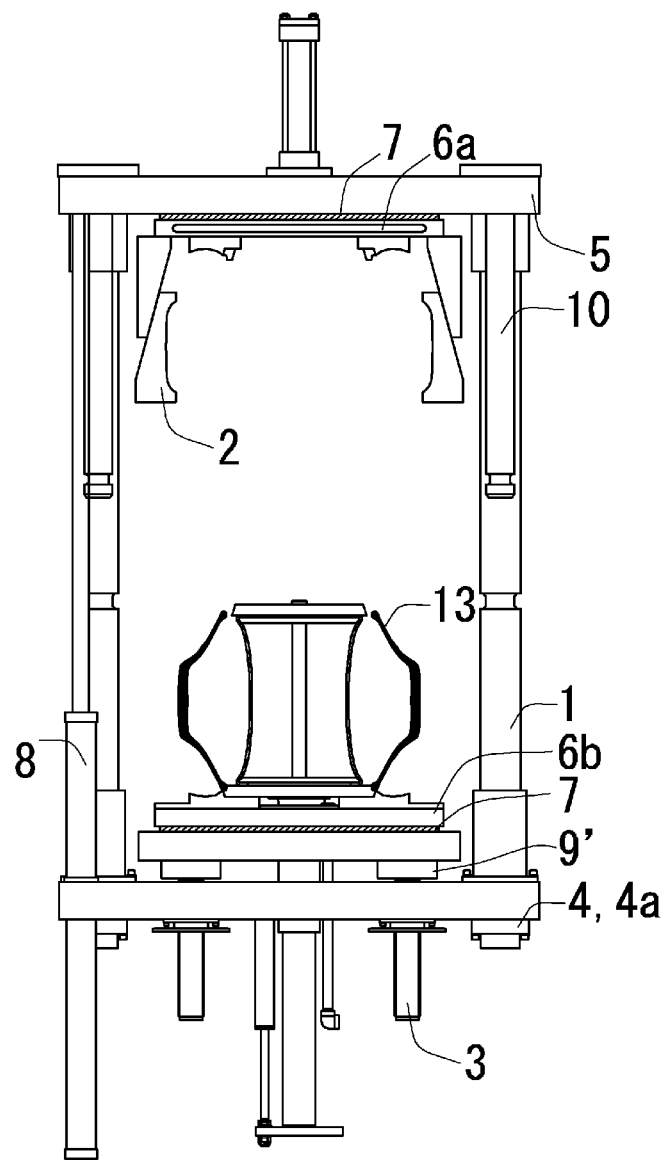
FIG. 5B is a schematic front view showing the structure of the tire curing apparatus shown in FIG. 5A.
Figure 6:
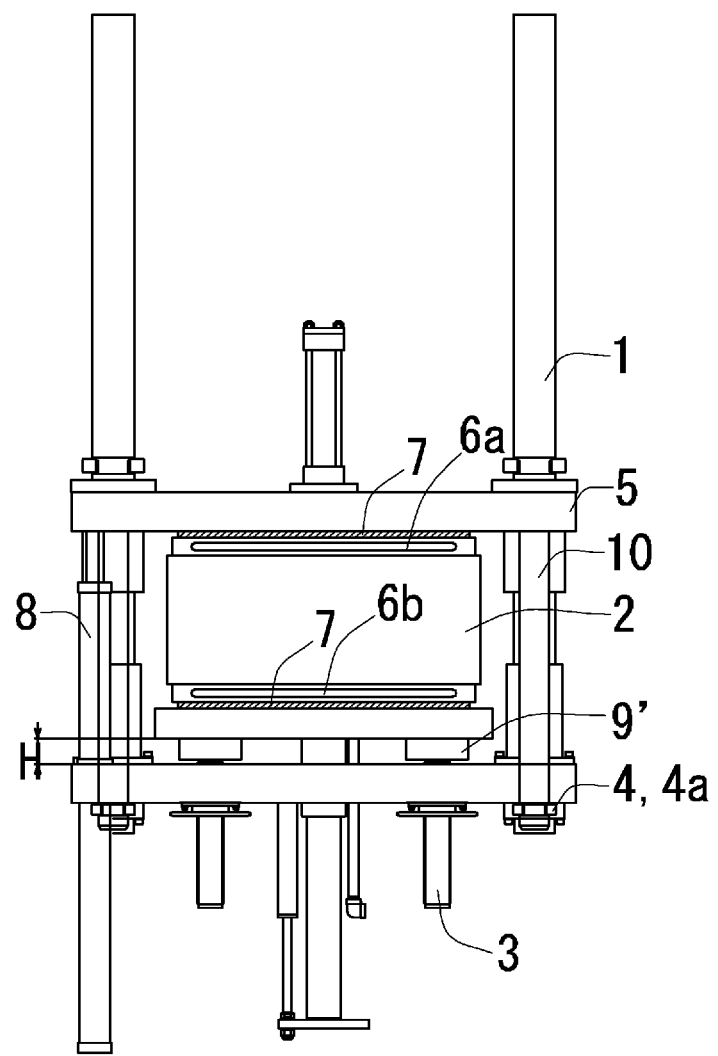
FIG. 6A is a schematic front view showing a state in which a mold whose mold thickness is largest has been closed in the tire curing apparatus shown in FIG. 5A.

For reference, a structure of a conventional tire curing apparatus having a clamp rod is shown in FIG. 5 and FIG. 6.

Here, the structure is not necessarily formed so that the upper end of the clamp rod 14 is fixed to the upper plate 5, and is fitted to the clamp block 4a disposed at the lower plate 10. For example, the structure can also be formed so that the lower end of the clamp rod is fixed to the lower plate 10, and a clamp groove is formed at its upper end side, and the clamping device 4 (clamp block 4a) is disposed at the upper plate 5.

Additionally, although a plurality of clamp grooves are formed at the clamp rod 14 in accordance with the size of a mold that is attachable to the tire curing apparatus B, specific limitations are not imposed on the number of clamp grooves as long as the number thereof is two or more. Here, it is also possible to form three or more clamp grooves at the clamp rod as long as the clamp grooves are within a range that corresponds to the size of a mold to be used and within which the strength of the clamp rod 14 can be secured.

Additionally, the clamp groove 14a is not necessarily required to serve as a clamp position when the mold 2 (maximum-thickness mold) whose mold height becomes largest is used. For example, the structure may be formed so that the clamp groove 14a is formed at the guide rod in accordance with a mold that has a mold height falling within a range within which the mold is attachable to the tire curing apparatus B and whose mold height is less than a maximum value of the range.

Additionally, the clamp groove 14b is not necessarily required to serve as a clamp position when the mold 2 (minimum-thickness mold) whose mold height becomes smallest is used. For example, the structure may be formed so that the clamp groove 14b is formed at the guide rod in accordance with a mold that has a mold height falling within a range within which the mold is attachable to the tire curing apparatus B and whose mold height exceeds a minimum value of the range.

Additionally, the clamp groove is not necessarily required to be formed only at the clamp rod 14. For example, it is also possible to employ a structure in which a clamp groove is formed at the guide rod 1 in addition to the clamp rod 14 and in which the clamp block 4a is disposed at the upper plate 5. Additionally, a plurality of clamp grooves can also be formed at the guide rod 1.

Still additionally, it is also possible to firmly fix the position of the upper plate 5 through each clamp groove by allowing clamp grooves formed at the clamp rod 14 and clamp grooves formed at the guide rod 1 to positionally correspond to each other so that a clamping force is heightened with respect to the mold 2 that has been closed. Additionally, it is also possible to form a structure in which the number of clamp positions that can be selected is raised by allowing clamp grooves formed at the clamp rod 14 and clamp grooves formed at the guide rod 1 to positionally differ from each other so that a mold having a different size can be handled more easily.

In the tire curing apparatus B that is the second embodiment of the present invention described above, it is possible to select the clamp groove 14a or the clamp groove 14b formed at the clamp rod 14 in accordance with the height of the mold 2 to be used.

In other words, it is possible to clamp the mold 2, which has been closed, by means of the clamping device 4 at an appropriate clamp position. As a result, the distance by which the mold-height adjusting mechanism 3 raises the lower mold 2b is shortened, hence making it possible to configure the tire curing apparatus so that the height position of the mold 2 from the floor surface on which the tire curing apparatus B is placed does not become extremely high.

Additionally, the apparatus has a simple structure in which a plurality of clamp grooves are formed at the clamp rod 14. Therefore, it is possible to realize an apparatus configuration without greatly rearranging existing pieces of equipment.

Third Embodiment

A third embodiment of the present invention will be described with reference to FIG. 10. In the following description, the third embodiment is described while focusing on parts differing from those of the aforementioned first and second embodiments, and an overlapping description of the same component is omitted.

Figure 10:
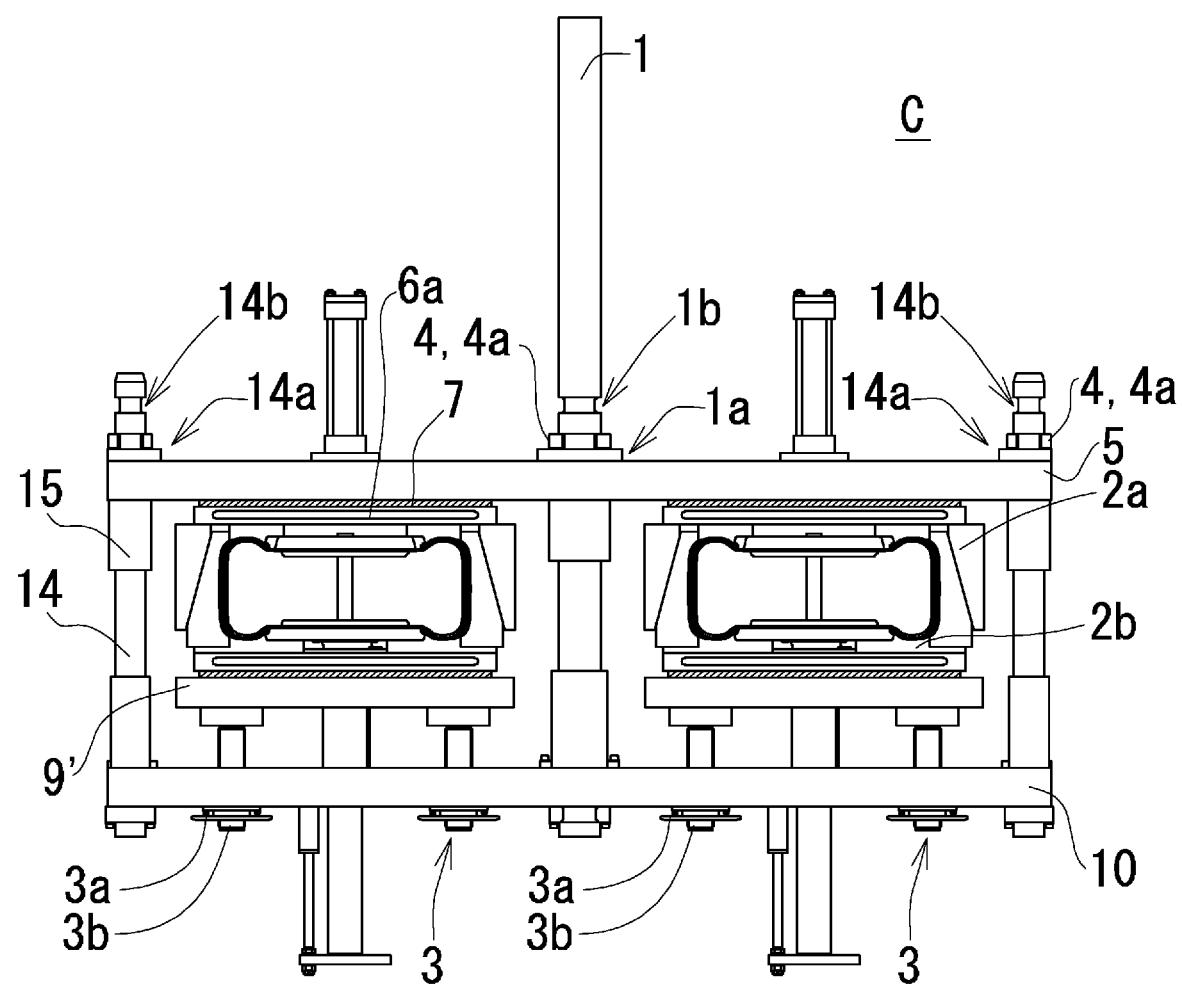
FIG. 10 is a schematic plan view showing a structure of a third embodiment of a tire curing apparatus to which the present invention is applied.

FIG. 10 is a schematic front view showing a structure of the third embodiment of a tire curing apparatus to which the present invention is applied.

A tire curing apparatus C that is the third embodiment of the tire curing apparatus to which the present invention is applied includes one guide rod 1 and two clamp rods 14 as shown in FIG. 10. Additionally, the tire curing apparatus C is a twin type tire curing apparatus having two molds 2 each of which consists of the upper mold 2a and the lower mold 2b.

The tire curing apparatus C is configured to simultaneously raise or simultaneously lower the two molds 2 of the tire curing apparatus C. The two upper molds 2a are each attached to the upper plate 5 through the thermal insulation plate 7 and the upper heat plate 6a. Additionally, the two lower molds 2b are each attached to the lower mold 2b through the screw 3b, the mold pressurizing mechanism 9', the thermal insulation plate 7, and the lower heat plate 6b.

Additionally, in the tire curing apparatus C, the clamp rod 14 is a substantially cylindrical rod-shaped body having an upper end fixed to the lower plate 10, and is a component that fixes the lower plate 10 by allowing the clamp groove 14a or the clamp groove 14b formed at its upper end side to be fitted to the clamp block 4a disposed at the upper plate 5.

Additionally, in the tire curing apparatus C, the upper plate is configured to be able to ascend and descend through the upper-mold raising/lowering device 8. Additionally, in the tire curing apparatus C, a guide block 15 that guides the upper end side of the clamp rod 14 toward the clamp block 4a is disposed.

Additionally, in the tire curing apparatus C, two clamp grooves, i.e., the clamp groove 1a (lower side) and the clamp groove 1b (upper side) are formed on a path along which the upper plate 5 on an outer peripheral surface of the guide rod 1 moves. The position of the clamp groove 1a and the position of the clamp groove 1b are formed so as to be adjusted to the position of the clamp groove 14a and the position of the clamp groove 14b formed at the clamp rod 14, respectively. In other words, the tire curing apparatus C has a clamp position at which the mold is clamped by both the clamp groove 1a and the clamp groove 14a and a clamp position at which the mold is clamped by both the clamp groove 1b and the clamp groove 14b.

Here, the two molds 2 are not necessarily required to be configured to simultaneously ascend or simultaneously descend. For example, the structure may be formed such that the two molds are configured to be able to ascend or descend independently of each other and so that the clamping mechanism is disposed in accordance with the height of each mold.

Additionally, the position of the clamp groove 1a and the position of the clamp groove 1b are not necessarily required to be formed so as to be adjusted to the position of the clamp groove 14a and the position of the clamp groove 14b formed at the clamp rod 14, respectively. For example, the position of the clamp groove 1a and the position of the clamp groove 1b may be formed so as to differ from the position of the clamp groove 14a and the position of the clamp groove 14b, respectively. Hence, the number of clamp positions that can be selected in accordance with the mold height is raised, and molds having different mold heights can be handled easily and more widely.

Additionally, clamp grooves are not necessarily required to be formed at the guide rod 1 and the clamp rod 14, respectively. For example, a manner in which a plurality of clamp grooves are formed only at the guide rod 1 or a manner in which a plurality of clamp grooves are formed only at the clamp rod 14 may be employed. Additionally, a structure in which two or more guide rods 1 are provided or a structure in which one clamp rod 14 or three or more clamp rods 14 are provided may be formed.

In the tire curing apparatus C, the upper plate 5 is lowered through the upper-mold raising/lowering device 8, and, as a result, the clamp block 4a disposed at the upper plate 5 is fitted to the clamp groove 1a or the clamp groove 1b of the guide rod 1. Additionally, the upper plate 5 is lowered, and, as a result, the clamp groove 14a or the clamp groove 14b formed at the upper end side of the clamp rod 14 and the clamp block 4a disposed at the upper plate 5 are fitted to each other.

Figure 9A:
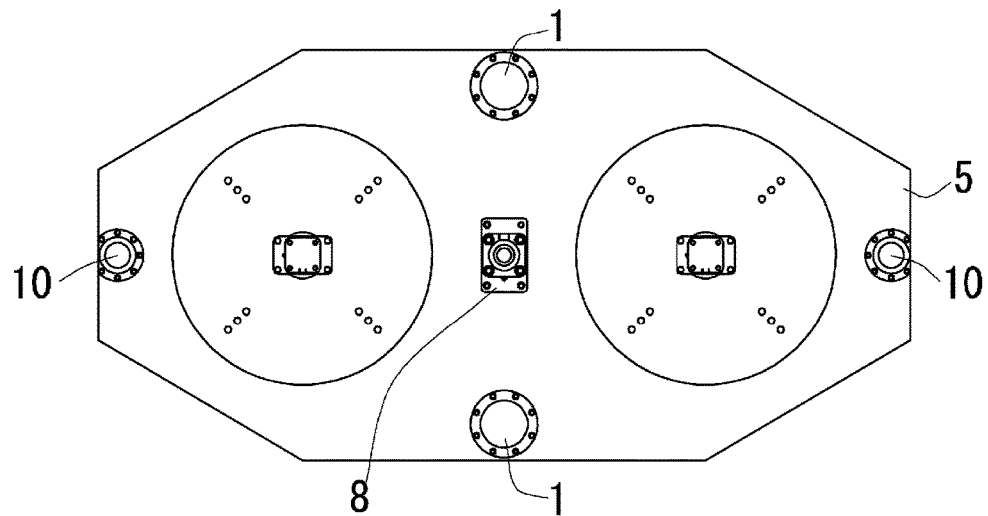
FIG. 9A is a schematic plan view showing a structure of a conventional twin-type (two-mold) tire curing apparatus.
Figure 9B:
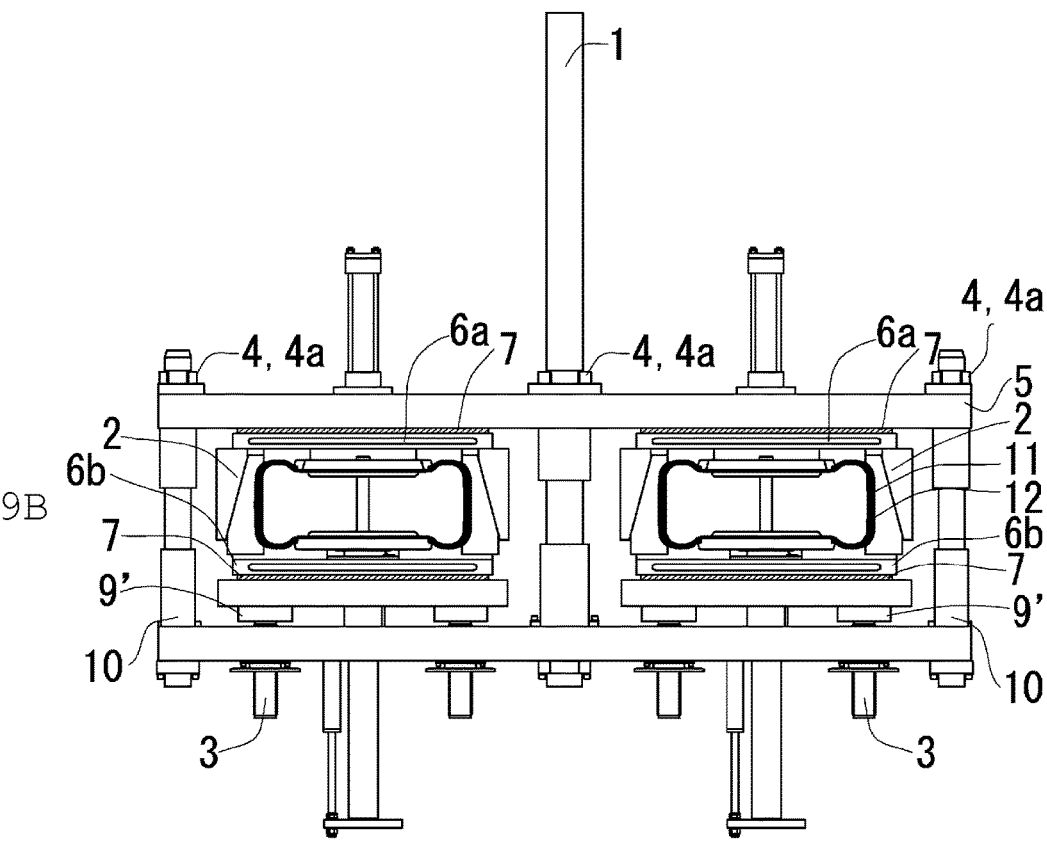
FIG. 9B is a schematic front view showing the structure of the tire curing apparatus shown in FIG. 9A.

For reference, a structure of a conventional tire curing apparatus having two molds, a guide rod, and a clamp rod is shown in FIG. 9A and FIG. 9B.

In the tire curing apparatus C that is the third embodiment of the present invention described above, it is possible to select the clamp groove 1a or the clamp groove 1b formed at the guide rod 1 and the clamp groove 14a or the clamp groove 14b formed at the clamp rod 14 in accordance with the height of the mold 2 to be used.

In other words, it is possible to clamp the mold 2, which has been closed, by means of the clamping device 4 at an appropriate clamp position. As a result, the distance by which the mold-height adjusting mechanism 3 raises the lower mold 2b is shortened, hence making it possible to configure the tire curing apparatus so that the height position of the mold 2 from the floor surface on which the tire curing apparatus B is placed does not become extremely high.

Additionally, the apparatus has a simple structure in which a plurality of clamp grooves are formed at the clamp rod 14. Therefore, it is possible to realize an apparatus configuration without greatly rearranging existing pieces of equipment.

Fourth Embodiment

A fourth embodiment of the present invention will be described with reference to FIG. 11 to FIG. 13. In the following description, the fourth embodiment is described while focusing on parts differing from those of the first to third embodiments described above, and an overlapping description of the same component is omitted.

Figure 11A:
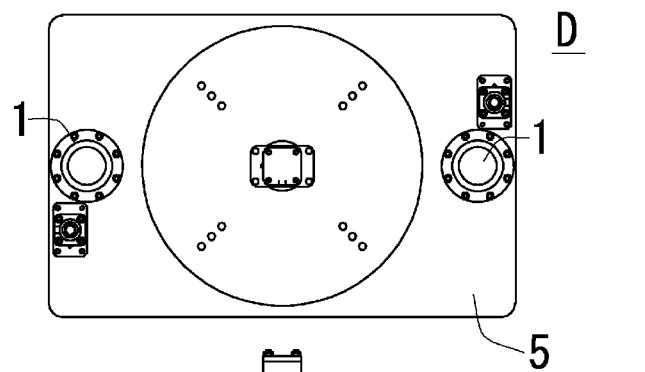
FIG. 11A is a schematic plan view showing a structure of a fourth embodiment of a tire curing apparatus to which the present invention is applied.
Figure 11B:
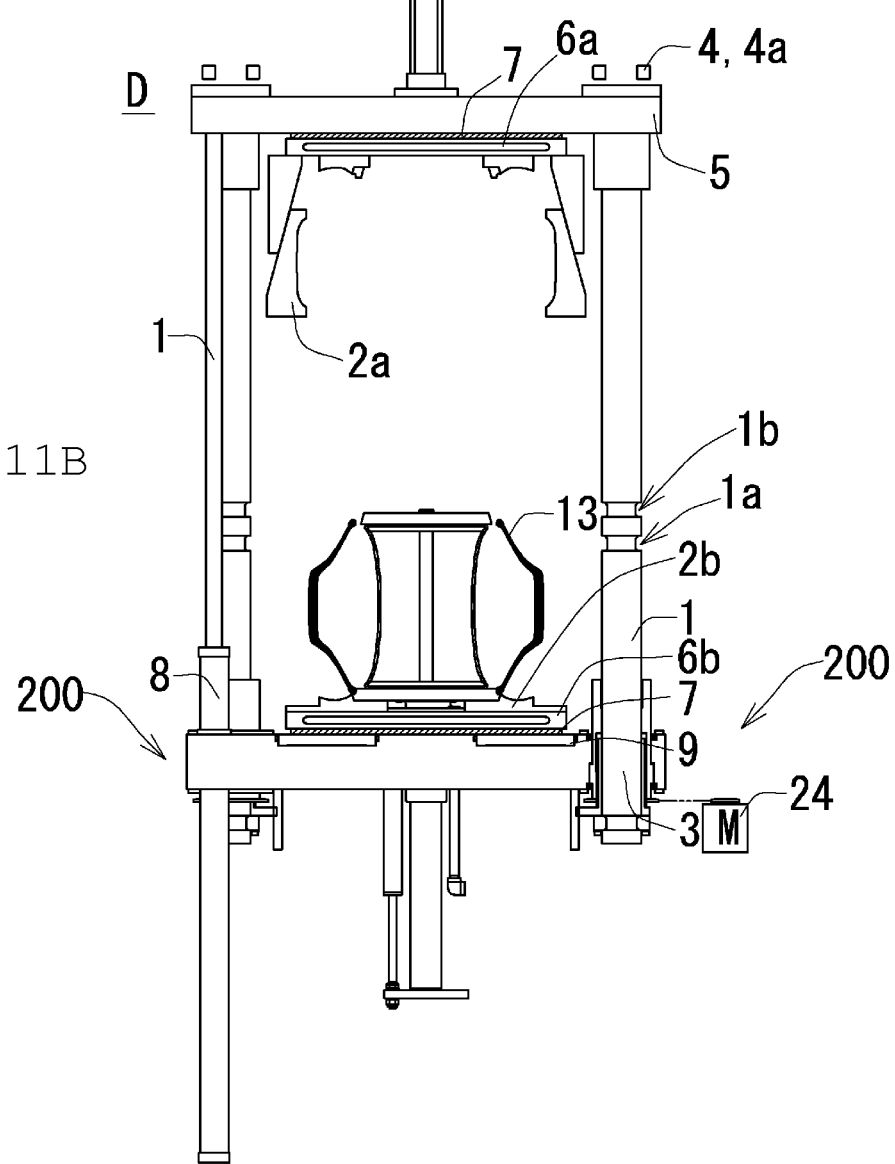
FIG. 11B is a schematic front view of the tire curing apparatus shown in FIG. 11A.
Figure 12A:
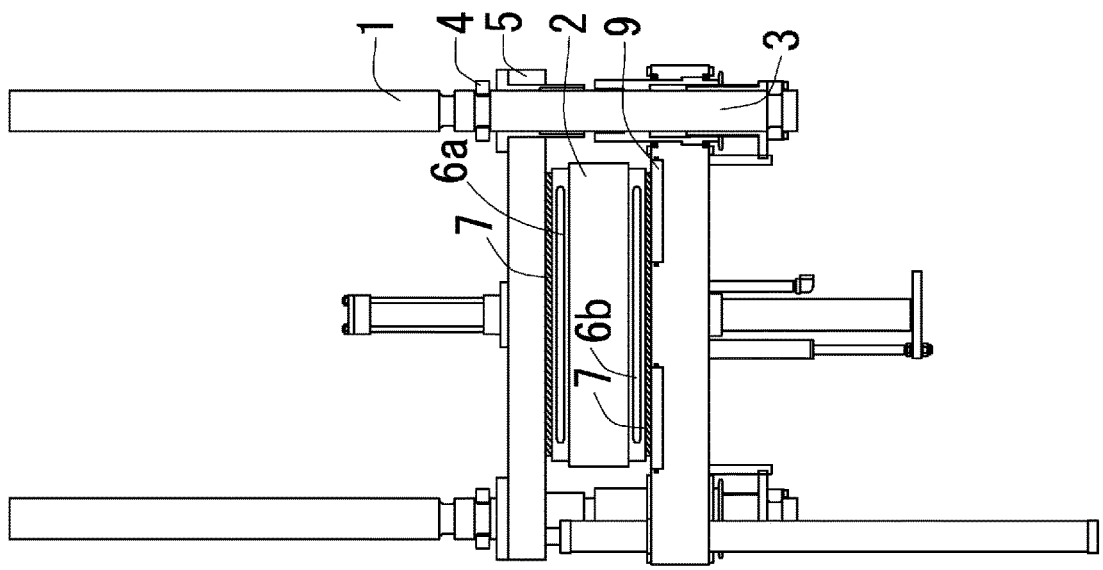
FIG. 12A is a schematic front view showing a state in which a mold whose mold thickness is largest has been closed in the tire curing apparatus shown in FIG. 11A.
Figure 12B:
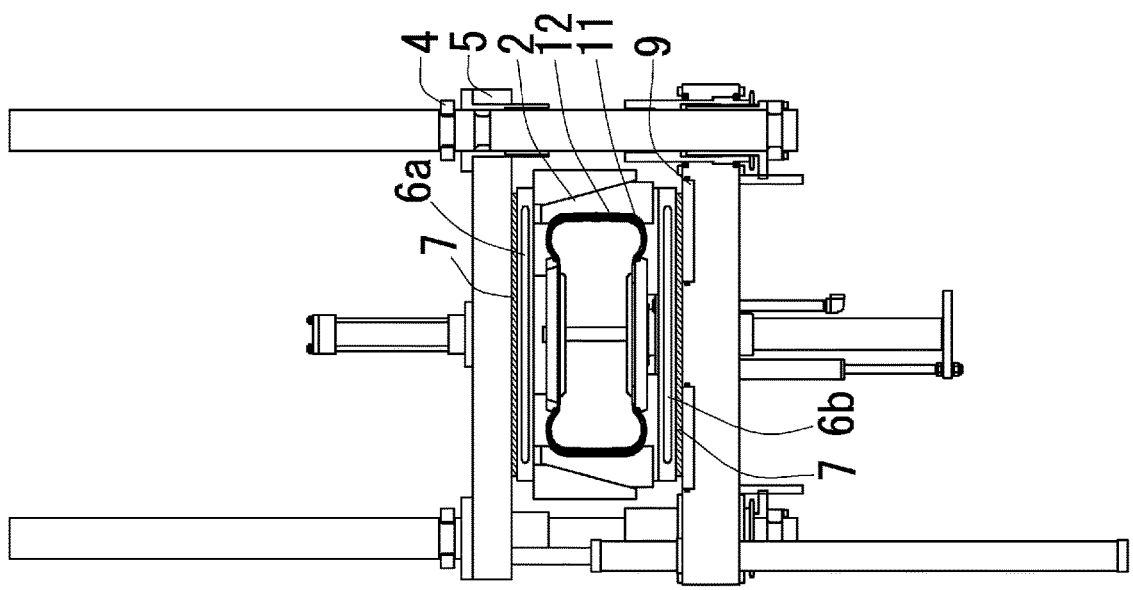
FIG. 12B is a schematic front view showing a state in which a mold whose mold thickness is smallest has been closed in the tire curing apparatus shown in FIG. 11A.
Figure 13A:
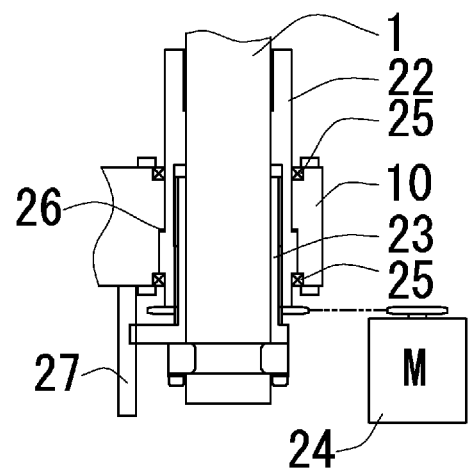
FIG. 13A is a cross-sectional view of a guide-rod adjusting mechanism when corresponding to a mold whose mold height becomes largest.
Figure 13B:
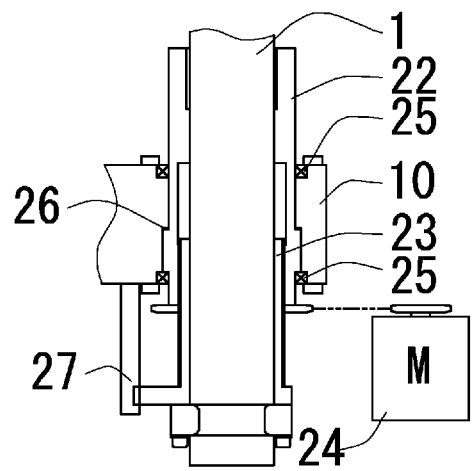
FIG. 13B is a cross-sectional view of the guide-rod adjusting mechanism when corresponding to a mold whose mold height becomes smallest.

FIG. 11A is a schematic plan view showing a structure of the fourth embodiment of a tire curing apparatus to which the present invention is applied, and FIG. 11B is a schematic front view of the tire curing apparatus shown in FIG. 11A. FIG. 12A is a schematic front view showing a state in which a mold whose mold thickness is largest has been closed in the tire curing apparatus shown in FIG. 11A, and FIG. 12B is a schematic front view showing a state in which a mold whose mold thickness is smallest has been closed in the tire curing apparatus shown in FIG. 11A. FIG. 13A is a cross-sectional view of a guide-rod adjusting mechanism when corresponding to a mold whose mold height becomes largest, and FIG. 13B is a cross-sectional view of the guide-rod adjusting mechanism when corresponding to a mold whose mold height becomes smallest.

A tire curing apparatus D that is the fourth embodiment of the tire curing apparatus to which the present invention is applied includes two guide rods 1 as shown in FIG. 11A and FIG. 11B. Additionally, a guide-rod adjusting mechanism 200 is disposed at the lower end side of each guide rod 1, and the guide rod 1 is configured to be able to ascend and descend with respect to the lower plate 10 in the vertical direction.

The guide-rod adjusting mechanism 200 mentioned here is a guide-rod adjusting mechanism defined in the claims of the present application. For descriptive convenience, only a right-hand guide-rod adjusting mechanism 200 that is one of two guide-rod adjusting mechanisms 200 is shown, and its cross-sectional structure is partially shown in FIG. 11B.

Additionally, the guide rod 1 has two clamp grooves, i.e., the clamp groove 1a (lower side) and the clamp groove 1b (upper side) formed on a path along which the upper plate 5 moves.

The guide-rod adjusting mechanism 200 of the tire curing apparatus D has a guide bush 22, an adjusting screw 23, an adjusting-screw drive device 24, a bearing 25, a thrust pad 26, and a whirl-stop guide 27 (see FIG. 13A and FIG. 13B).

The guide bush 22 is rotatably held by the lower plate 10 through the bearing 25 and the thrust pad 26. Additionally, a threaded portion (whose reference sign is omitted) is formed in an inner peripheral surface of a lower portion of the guide bush 22.

Additionally, the guide rod 1 slidably passes through the guide bush 22, and the adjusting screw 23 is fixed to a lower end of the guide rod 1. Additionally, the whirl-stop guide 27 is disposed near a lower end of the adjusting screw 23. The adjusting-screw drive device 24 is a component that rotates the guide bush 22.

Additionally, the threaded portion formed in the inner peripheral surface of the lower portion of the guide bush 22 is engaged with the adjusting screw 23 fixed to the guide rod 1. The adjusting screw 23 ascends and descends along the threaded portion by rotating the guide bush 22 by means of the adjusting-screw drive device 24, and, in accordance with this movement, the guide rod 1 ascends and descends with respect to the lower plate 10.

In the tire curing apparatus D, it is possible to raise and lower the guide rod 1 with respect to the lower plate 10 by means of the guide-rod adjusting mechanism 200. This makes it possible to change the position of the clamp groove 1a and the position of the clamp groove 1b formed at the guide rod 1 to a desired height position.

In other words, it is possible to freely change the clamp position with respect to different mold heights and adjust its position without providing the mold-height adjusting mechanism 3 unlike the first to third embodiments of the present invention described above.

Still additionally, it is also possible to set the number of clamp grooves formed at the guide rod 1 at one by lengthening the distance by which the guide rod 1 can ascend and descend by means of the guide-rod adjusting mechanism 200. In other words, it becomes possible to adjust the clamp position with respect to different mold heights merely by performing the operation of adjusting the position of a clamp groove to an appropriate height position while raising and lowering the guide rod 1 without providing a plurality of clamp grooves.

Here, in the tire curing apparatus D, it is also possible to additionally provide both a clamp rod at which a clamp groove is formed and a clamp block that can be fitted to the clamp groove so as to serve as a clamping mechanism.

Fifth Embodiment

A fifth embodiment of the present invention will be described with reference to FIG. 15. In the following description, the fifth embodiment is described while focusing on parts differing from those of the first to fourth embodiments described above, and an overlapping description of the same component is omitted.

Figure 15A:
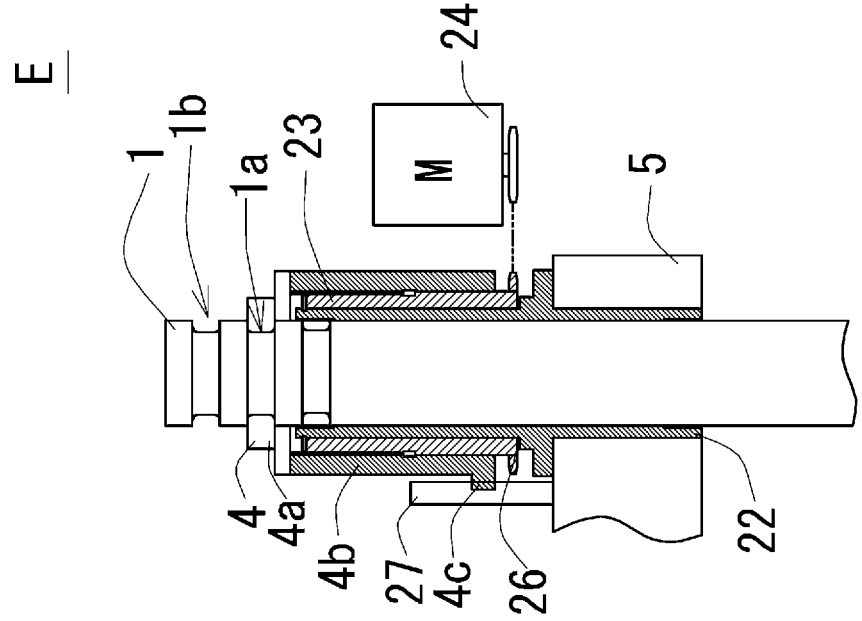
FIG. 15A is a cross-sectional view when corresponding to a mold whose mold height becomes largest in a clamp adjusting mechanism of a fifth embodiment of a tire curing apparatus to which the present invention is applied.
Figure 15B:
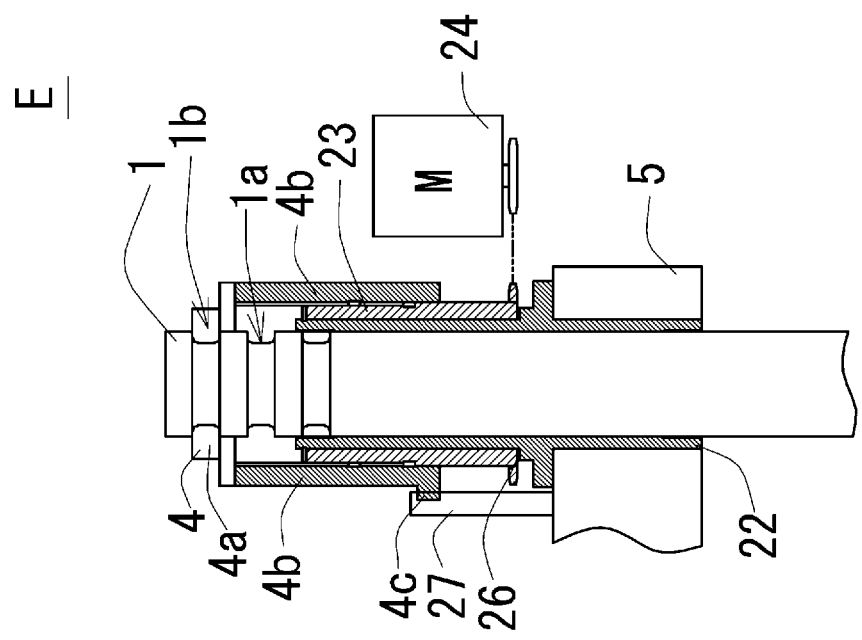
FIG. 15B is a cross-sectional view of the clamp adjustment mechanism when corresponding to a mold whose mold height becomes smallest.

FIG. 15A is a cross-sectional view when corresponding to a mold whose mold height becomes largest in a clamp adjusting mechanism of the fifth embodiment of a tire curing apparatus to which the present invention is applied, and FIG. 15B is a cross-sectional view of the clamp adjustment mechanism when corresponding to a mold whose mold height becomes smallest.

In a tire curing apparatus E that is the fifth embodiment of the tire curing apparatus to which the present invention is applied, the clamping device 4 is disposed at the upper plate 5, and is configured so that its height position with respect to the upper plate 5 can be changed through the clamp adjusting mechanism as shown in FIG. 15A and FIG. 15B. With respect to the tire curing apparatus E, a description of its overall structure is omitted, and is given while focusing on a structure of the clamp adjusting mechanism that is the present embodiment.

The tire curing apparatus E includes two guide rods 1 (only one of which is shown in the drawing). For descriptive convenience, only a right-hand clamp adjusting mechanism that is one of two clamp adjusting mechanisms is shown, and its cross-sectional structure is partially shown in FIG. 15A and FIG. 15B.

The guide rod 1 has two clamp grooves, i.e., the clamp groove 1a (lower side) and the clamp groove 1b (upper side) formed on a path along which the upper plate 5 moves.

The clamp adjusting mechanism has the clamp block 4a, a sleeve 4b, a whirl-stop collar 4c, the guide bush 22, the adjusting screw 23, the adjusting-screw drive device 24, the thrust pad 26, and the whirl-stop guide 27 (see FIG. 15A and FIG. 15B).

The sleeve 4b that has a substantially cylindrical shape is attached to the clamp block 4a, which serves to fit and fix the clamp groove 1a or the clamp groove 1b, of the clamping device 4. The sleeve 4b is a component that supports the clamp block 4a and that ascends and descends with respect to the upper plate 5 together with the clamp block 4a.

An inside screw (not shown) that is engaged with the adjusting screw 23 rotatably attached to the upper plate 5 is disposed at an inner periphery of the sleeve 4b. Additionally, the whirl-stop collar 4c that is slidably engaged with the whirl-stop guide 27 disposed at the upper plate 5 is formed at an outer periphery of a lower end portion of the sleeve 4b. Additionally, the guide rod 1 slidably passes through the guide bush 22.

Additionally, the adjusting screw 23 is configured such that the adjusting screw 23 is held by the thrust pad 26 and can be rotated by the adjusting-screw drive device 24.

In this tire curing apparatus E, the adjusting screw 23 is rotated through the adjusting-screw drive device 24, and, as a result, the sleeve 4b being engaged with the adjusting screw 23 ascends and descends, hence making it possible to change the height position with respect to the upper plate 5 of the clamping device 4 (clamp block 4a). In other words, it is possible to adjust a clamp position at which the clamping device 4 and either the clamp groove 1a or the clamp groove 1b of the guide rod 1 are fitted to each other by changing the position of the clamping device 4.

As thus described, it is possible to change the clamp position by means of the clamp adjusting mechanism in the tire curing apparatus E, and therefore it is possible to freely change the clamp position with respect to different mold heights and adjust its position without providing the mold-height adjusting mechanism 3 unlike the first to third embodiments of the present invention described above.

Still additionally, it is also possible to set the number of clamp grooves formed at the guide rod 1 at one by lengthening the distance by which the clamping device 4 can ascend and descend by means of the clamp adjusting mechanism. In other words, it becomes possible to adjust the clamp position with respect to different mold heights merely by performing the operation of adjusting the position of the clamp block 4a to an appropriate height position while raising and lowering the clamping device 4 without providing a plurality of clamp grooves.

Here, in the tire curing apparatus E, it is also possible to additionally provide both a clamp rod at which a clamp groove is formed and a clamp block that can be fitted to this clamp groove as a clamping mechanism. Additionally, in a configuration in which a clamp rod is provided, it is also possible to provide the aforementioned clamp adjusting mechanism at a clamping device corresponding to a clamp groove formed at the clamp rod. Additionally, it is also possible to combine a clamp groove formed at a clamp rod and the aforementioned clamp adjusting mechanism together without forming a clamp groove at a guide rod.

Additionally, the clamping device 4 or the clamp adjusting mechanism is not necessarily required to be provided at the upper plate 5, and it is also possible to configure the lower plate 10 such that the lower plate 10 can ascend and descend along the guide rod 1 and to provide the clamping device 4 and the clamp adjusting mechanism at this lower plate 10. It should be noted that the clamping device 4 and the clamp adjusting mechanism are provided at the upper plate 5, hence making it possible to dispose these structures at a position away from the bladder 11a disposed at the lower plate 10 or from a mold that has been closed. As a result, a high temperature generated from the bladder 11a or from the mold, the leakage of a curing medium, and the like do not easily affect the clamp adjusting mechanism, and it is possible to improve the durability of the clamp adjusting mechanism. Additionally, it becomes unnecessary to demount the bladder or the mold when the clamp adjusting mechanism breaks down and is repaired or checked, and hence it is possible to facilitate a maintenance task.

Additionally, in the tire curing apparatus E, the guide-rod adjusting mechanism 200 is not required to be disposed at the long, large guide rod 1 in such a manner as in the tire curing apparatus D in comparison with the tire curing apparatus D that is the fourth embodiment of the present invention. In other words, it is possible to dispose the clamp adjusting mechanism more easily than the guide-rod adjusting mechanism 200 in assembling or in a built-in operation into the structure of an existing tire curing apparatus. Additionally, even if the clamping device 4 or a constituent member of the clamp adjusting mechanism is worn out, the guide rod 1 is affected only a little, and it becomes easy to maintain the accuracy of a mold opening/closing operation.

As described above, the tire curing apparatus according to the present invention is capable of corresponding to various mold heights although its mechanism is simple, and is capable of reducing its apparatus size, and is excellent in handleability.

Additionally, the tire curing method according to the present invention is a method of performing tire curing by use of a tire curing apparatus that is capable of corresponding to various mold heights although its mechanism is simple, that is capable of reducing its apparatus size, and that is excellent in handleability.

REFERENCE SIGNS LIST

1 Guide rod
   1a Clamp groove
   1b Clamp groove
2 Mold
   2a Upper mold
   2b Lower mold
3 Mold-height adjusting mechanism
   3a Nut
   3b Screw
4 Clamping device
   4a Clamp block
   4b Sleeve
   4c Whirl-stop collar
5 Upper plate
   6a Upper heat plate
   6b Lower heat plate
7 Thermal insulation plate
8 Upper-mold raising/lowering device
9 Mold pressurizing mechanism (Doughnut type)
9' Mold pressurizing mechanism (Hydraulic cylinder type)
10 Lower plate
11 Bladder raising/lowering device
   11a Bladder
12 Tire
13 Green tire
14 Clamp rod
   14a Clamp groove
   14b Clamp groove
15 Guide block
200 Guide-rod adjusting mechanism
22 Guide bush
23 Adjusting screw
24 Adjusting-screw drive device
25 Bearing
26 Thrust pad
27 Whirl-stop guide

The invention claimed is:

1. A tire curing apparatus comprising:
a first plate to which a first mold provided with a bladder that heats and pressurizes a green tire is attached;
a second plate to which a second mold is attached wherein the second plate is configured to cooperate with the first plate such that the bladder can be sandwiched between the first mold and the second mold;
a cylindrical guide rod that is attached to the first plate and to the second plate and that guides relative movements of both the first plate and the second plate;
a mold moving mechanism that relatively moves the first plate and the second plate along the guide rod;
a mold pressurizing mechanism that applies pressure to both the first mold and the second mold that have been closed together and holds the first mold and the second mold in a closed state when the green tire is heated and pressurized by the bladder; and
a clamping mechanism that fixes relative positions of both the first plate and the second plate and holds the first plate and the second plate in a closed state at a first clamp position or a second clamp position corresponding to a size of the first mold and the second mold that have been closed together when the green tire is heated and pressurized by the bladder,
wherein the clamping mechanism comprises:
a first clamp groove that is formed at the guide rod and that serves as the first clamp position;
a second clamp groove that is formed at the guide rod and that serves as the second clamp position wherein the first clamp groove and the second clamp groove are longitudinally spaced apart by a predetermined distance; and
a clamp portion that is disposed at least at either one of the first plate and the second plate wherein the clamp portion fixes relative positions of both the first plate and the second plate by being fitted to the clamp groove,
wherein the clamp portion includes a clamp-portion adjusting mechanism which is configured to change a distance between the clamp portion and either the first plate or the second plate that is provided with the clamp portion,
wherein the second plate is disposed above the first plate in a vertical direction,
wherein a mold-height adjusting mechanism is connected to the first plate in order to change a height of the first mold.

2. The tire curing apparatus according to claim 1, further comprising a position detecting means that is capable of detecting the clamp position corresponding to a size of the first mold and the second mold that have been closed together.

3. The tire curing apparatus according to claim 1, wherein a plurality of the clamp grooves are formed.

4. The tire curing apparatus according to claim 1, wherein the clamp portion is disposed at the second plate.

5. A tire curing apparatus comprising:
a first plate to which a first mold provided with a bladder that heats and pressurizes a green tire is attached;
a second plate to which a second mold is attached wherein the second plate is configured to cooperate with the first plate such that the bladder can be sandwiched between the first mold and the second mold;
a cylindrical guide rod that is attached to the first plate and to the second plate and that guides relative movements of both the first plate and the second plate;
a mold moving mechanism that relatively moves the first plate and the second plate along the guide rod;
a mold pressurizing mechanism that applies pressure to both the first mold and the second mold that have been closed together and holds the first mold and the second mold in a closed state when the green tire is heated and pressurized by the bladder; and
a clamping mechanism that fixes relative positions of both the first plate and the second plate and holds the first plate and the second plate in a closed state at a first clamp position or a second clamp position corresponding to a size of the first mold and the second mold that have been closed together when the green tire is heated and pressurized by the bladder,
wherein the clamping mechanism comprises:
a clamp rod that is positioned at a surface, which faces the second plate, of the first plate, that is a cylindrical body formed so as to protrude in a direction of the second plate, and that has a first clamp groove, serving as the first clamp position and formed at a front-end side of the clamp rod, and a second clamp groove, serving as the second clamp position and formed at a front-end side of the clamp wherein the first clamp groove and the second clamp groove are longitudinally spaced apart by a predetermined distance; and
a clamp portion that is disposed at the second plate and that fixes relative positions of both the first plate and the second plate by being fitted to the clamp groove, or
wherein the clamping mechanism comprises:
a clamp rod that is positioned at a surface, which faces the first plate, of the second plate, that is a cylindrical body formed so as to protrude in a direction of the first plate, and that has a clamp groove serving as the clamp position and formed at a front-end side of the clamp rod; and
a clamp portion that is disposed at the first plate and that fixes relative positions of both the first plate and the second plate by being fitted to the clamp groove,
wherein the clamp portion includes a clamp-portion adjusting mechanism that is capable of changing a distance between the clamp portion and either the first plate or the second plate that is provided with the clamp portion,
wherein the second plate is disposed above the first plate in a vertical direction,
wherein a mold-height adjusting mechanism is connected to the first plate in order to change a height of the first mold.

6. The tire curing apparatus according to claim 5, wherein the clamp portion is disposed at the second plate.

7. The tire curing apparatus according to claim 6, wherein a plurality of the clamp grooves are formed.

8. The tire curing apparatus according to claim 7, further comprising a position detecting means that is capable of detecting the clamp position corresponding to a size of the first mold and the second mold that have been closed together.

9. The tire curing apparatus according to claim 6, further comprising a position detecting means that is capable of detecting the clamp position corresponding to a size of the first mold and the second mold that have been closed together.

10. The tire curing apparatus according to claim 5, further comprising a position detecting means that is capable of detecting the clamp position corresponding to a size of the first mold and the second mold that have been closed together.

11. The tire curing apparatus according to claim 5, wherein a plurality of the clamp grooves are formed.

12. A tire curing apparatus comprising:
a first plate to which a first mold provided with a bladder that heats and pressurizes a green tire is attached;
a second plate to which a second mold is attached wherein the second plate is configured to cooperate with the first plate such that the bladder can be sandwiched between the first mold and the second mold;
a cylindrical guide rod that is attached to the first plate and to the second plate and that guides relative movements of both the first plate and the second plate;
a mold moving mechanism that relatively moves the first plate and the second plate along the guide rod;
a mold pressurizing mechanism that applies pressure to both the first mold and the second mold that have been closed together and holds the first mold and the second mold a closed state when the green tire is heated and pressurized by the bladder; and
a clamp mechanism that fixes relative positions of both the first plate and the second plate and holds the first plate and the second plate in a closed state at a clamp position corresponding to a size of the first mold and the second mold that have been closed together when the green tire is heated and pressurized by the bladder,
wherein the clamping mechanism has at least one of a first clamping mechanism and a second clamping mechanism,
wherein the first clamping mechanism comprises:
   a first clamp groove I serving as a clamp position I and formed at the guide rod
   a first clamp groove II serving as a clamp position II and formed at the guide rod wherein the first clamp groove I and the first clamp groove II are longitudinally spaced apart by a predetermined distance; and
   a first clamp portion disposed at least at either one of the first plate and the second plate wherein the first clamp portion fixes relative positions of both the first plate and the second plate by being fitted to the first clamp groove,
wherein the second clamping mechanism compromises:
   a clamp rod that is positioned at a surface, which faces the second plate, of the first plate, that is a cylindrical body formed so as to protrude in a direction of the second plate, and that has second clamp grooves serving as the clamp positions, respectively, and formed at a front-end side of the clamp rod and at a plurality of mutually different positions in the longitudinal direction; and
   a second clamp portion that is disposed at the second plate and that fixes relative positions of both the first plate and the second plate by being fitted to the second clamp groove, or
wherein the second clamping mechanism compromises:
   a clamp rod that is positioned at a surface, which faces the first plate, of the second plate, that is a cylindrical body formed so as to protrude in a direction of the first plate, and that has second clamp grooves serving as the clamp positions, respectively, and formed at a front-end side of the clamp rod and at a plurality of mutually different positions in the longitudinal direction; and
   a second clamp portion that is disposed at the first plate and that fixes relative positions of both the first plate and the second plate by being fitted to the second clamp groove,
wherein at least one of the first clamp portion and the second clamp portion has a clamp-portion adjusting mechanism that is capable of changing a distance between the first clamp portion or the second clamp portion and either the first plate or the second plate that is provided with the first clamp portion or with the second clamp portion,
wherein the second plate is disposed above the first plate in a vertical direction,
wherein a mold-height adjusting mechanism is connected to the first plate in order to change a height of the first mold.

13. A tire curing method comprising:
a mold closing step of relatively moving a first plate, to which a first mold provided with a bladder that heats and pressurizes a green tire is attached, and a second plate, to which a second mold configured such that the bladder can be sandwiched between the first mold and the second mold in cooperation with the first mold is attached, along a guide rod attached to the first plate and to the second plate to close the first mold and the second mold together; and
a clamping step of fixing relative positions of both the first plate and the second plate and holding a closed state at a first clamp position or a second clamp position corresponding to a size of the first mold and the second mold that have been closed together,
wherein a first clamp groove serving as the first clamp position is formed at the guide rod,
wherein a second clamp groove serving as the second clamp position is formed at the guide rod such that the first clamp groove and the second clamp groove are longitudinally spaced apart by a predetermined distance,
wherein a clamp portion that fixes relative positions of both the first plate and the second plate by being fitted to the clamp groove is formed at at-least either one of the first plate and the second plate, and
the clamping step further includes a step of changing a distance between the clamp portion and either the first plate or the second plate that is provided with the clamp portion,
wherein the second plate is disposed above the first plate in a vertical direction,
wherein a mold-height adjusting mechanism is connected to the first plate in order to change a height of the first mold.

14. A tire curing method comprising:
a mold closing step of relatively moving a first plate, to which a first mold provided with a bladder that heats and pressurizes a green tire is attached, and a second plate, to which a second mold configured such that the bladder can be sandwiched between the first mold and the second mold in cooperation with the first mold is attached, along a guide rod attached to the first plate and to the second plate to close the first mold and the second mold together; and
a clamping step of holding the first plate and the second plate a closed state at a first clamp position or a second clamp position corresponding to a size of the first mold and the second mold that have been closed together, the clamping step including:

a step of fixing relative positions of both the first plate and the second plate either by fitting a first clamp groove formed at a front end of a cylindrical clamp rod disposed at the first plate or the second plate to a clamp portion disposed at the second plate or first plate respectively or by fitting a second clamp groove formed at a front end of a cylindrical clamp rod disposed at the first plate or the second plate to a clamp portion disposed at the second plate or first plate respectively wherein the first clamp groove and the second clamp groove are longitudinally spaced apart by a predetermined distance; and a step of changing a distance between the clamp portion and either the first plate or the second plate that is provided with the clamp portion, wherein the second plate is disposed above the first plate in a vertical direction, wherein a mold-height adjusting mechanism is connected to the first plate in order to change a height of the first mold.

* * * * *